(12) United States Patent
Brochman

(10) Patent No.: US 12,343,783 B2
(45) Date of Patent: *Jul. 1, 2025

(54) TUBING BENDER

(71) Applicant: Brochman Innovations, LLC, White Bear Lake, MN (US)

(72) Inventor: Todd Brochman, White Bear Lake, MN (US)

(73) Assignee: Brochman Innovations, LLC, White Bear Lake, MN (US)

(*) Notice: Subject to any disclaimer, the term of this patent is extended or adjusted under 35 U.S.C. 154(b) by 370 days.

This patent is subject to a terminal disclaimer.

(21) Appl. No.: 17/789,151

(22) PCT Filed: Dec. 21, 2020

(86) PCT No.: PCT/US2020/066341
§ 371 (c)(1),
(2) Date: Jun. 24, 2022

(87) PCT Pub. No.: WO2021/133715
PCT Pub. Date: Jul. 1, 2021

(65) Prior Publication Data
US 2023/0031227 A1 Feb. 2, 2023

Related U.S. Application Data

(60) Provisional application No. 63/001,905, filed on Mar. 30, 2020, provisional application No. 62/954,244, filed on Dec. 27, 2019.

(51) Int. Cl.
B21D 7/06 (2006.01)
B21D 7/022 (2006.01)
(Continued)

(52) U.S. Cl.
CPC ............ B21D 7/06 (2013.01); B21D 7/022 (2013.01); B21D 7/12 (2013.01); B21D 7/14 (2013.01); B21D 7/16 (2013.01)

(58) Field of Classification Search
CPC . B21D 7/00; B21D 7/02; B21D 7/021; B21D 7/024; B21D 7/06; B21D 7/14; B21D 7/022; B21D 7/12
See application file for complete search history.

(56) References Cited

U.S. PATENT DOCUMENTS 2,569,544 A 10/1951 Tal
D173,830 S 1/1955 Bergman
(Continued)

FOREIGN PATENT DOCUMENTS

CN 105764625 A 7/2016
CN 107350316 A 11/2017
(Continued)

OTHER PUBLICATIONS

EP 1095716A1, Tandart May 2001.*
(Continued)

Primary Examiner — Edward T Tolan
(74) Attorney, Agent, or Firm — Merchant & Gould P.C.

(57) ABSTRACT

A compact, lightweight, portable tubing bender configured to enable one-handed operation. The tubing bender includes a portable housing including a handle portion, a bender shoe operably coupled to the portable housing, the bender shoe defining an arcuate channel configured to restrain a length of tubing along a prescribed arc during bending operations, a guide gear fixedly coupled to the bender shoe, and a guide frame pivotably coupled to the bender shoe, the guide frame including a motor, a driven gear and a guide member, the motor configured to drive the driven gear along the guide gear to pivot the guide frame relative to the bender shoe, so (Continued)

as to move the guide member during bending operations to guide the length of tubing along the arcuate channel of the bender shoe.

15 Claims, 23 Drawing Sheets

(51) Int. Cl.
  *B21D 7/12* (2006.01)
  *B21D 7/14* (2006.01)
  *B21D 7/16* (2006.01)

(56) References Cited

U.S. PATENT DOCUMENTS

| | | | |
|---|---|---|---|
| 2,709,382 A | 5/1955 | Safranski | |
| D188,003 S | 5/1960 | Curtiss | |
| 3,059,683 A * | 10/1962 | Atherton | B21D 7/024 92/120 |
| 3,130,633 A | 4/1964 | Rantsch | |
| 3,336,779 A | 10/1964 | Schall | |
| 3,680,347 A | 8/1972 | Schenck et al. | |
| 3,785,190 A | 1/1974 | Schall et al. | |
| 3,824,835 A | 7/1974 | Jackson | |
| 3,828,602 A | 8/1974 | Leithiser | |
| 3,889,508 A | 6/1975 | Sugita | |
| 4,249,407 A | 2/1981 | Fogleman | |
| 4,269,056 A | 5/1981 | Kozinski | |
| 4,442,695 A | 4/1984 | Gardner | |
| 4,452,064 A | 6/1984 | Custin | |
| 4,622,837 A | 11/1986 | Bergman | |
| 4,719,577 A * | 1/1988 | Eley | G05B 19/23 700/165 |
| 4,760,727 A | 8/1988 | Van Landingham | |
| 4,827,755 A | 5/1989 | Strybel | |
| 4,843,858 A | 7/1989 | Grimm et al. | |
| 4,926,672 A | 5/1990 | Swanson | |
| 5,022,249 A | 6/1991 | Caporusso et al. | |
| 5,056,347 A | 10/1991 | Wagner | |
| D326,395 S | 5/1992 | Aulgur | |
| 5,203,192 A | 4/1993 | Kimura | |
| 5,301,530 A | 4/1994 | Beelen et al. | |
| 5,305,223 A * | 4/1994 | Saegusa | B21D 7/12 700/165 |
| 5,727,419 A | 3/1998 | Walsten | |
| D410,658 S | 6/1999 | Walsten | |
| 5,931,039 A | 8/1999 | Yoshimizu et al. | |
| 6,026,668 A | 2/2000 | Oda et al. | |
| 6,463,780 B1 | 10/2002 | Kalanish | |
| 6,609,405 B1 | 8/2003 | Bates et al. | |
| 7,024,905 B1 | 4/2006 | Carlson et al. | |
| 7,143,629 B1 | 12/2006 | Chiu | |
| 7,234,338 B2 | 6/2007 | Mirtz et al. | |
| 7,293,362 B2 | 11/2007 | Konen | |
| 7,900,495 B2 | 3/2011 | Latoria | |
| D645,061 S | 9/2011 | Plummer | |
| 8,333,097 B1 | 12/2012 | Frear | |
| 8,438,955 B2 | 5/2013 | Wilson, Jr. et al. | |
| 8,511,131 B2 | 8/2013 | Latoria | |
| 8,991,229 B1 | 3/2015 | Cheng | |
| 9,156,075 B2 | 10/2015 | Houle et al. | |
| 9,662,698 B2 | 5/2017 | Chuang | |
| 9,718,108 B2 | 8/2017 | Latoria | |
| 9,968,976 B2 | 5/2018 | Klinger | |
| 10,441,984 B1 | 10/2019 | Brochman | |
| 10,518,310 B2 | 12/2019 | Tang et al. | |
| D872,602 S | 1/2020 | Doeren | |
| 10,919,080 B1 * | 2/2021 | Brochman | B21D 7/16 |
| 2008/0190164 A1 | 8/2008 | Boon et al. | |
| 2009/0188291 A1 | 7/2009 | Itrich et al. | |
| 2011/0000273 A1 | 1/2011 | Latoria | |
| 2013/0180053 A1 | 7/2013 | Rubin et al. | |
| 2017/0274437 A1 | 9/2017 | Klinger | |
| 2018/0126436 A1 | 5/2018 | Lan | |
| 2020/0222962 A1 | 7/2020 | Brochman | |
| 2021/0069766 A1 * | 3/2021 | Sweeney | B21D 7/14 |

FOREIGN PATENT DOCUMENTS

| | | | |
|---|---|---|---|
| DE | 4319591 A1 | 10/1994 | |
| DE | 69407444 T2 | 8/1998 | |
| DE | 60007262 T2 | 9/2004 | |
| EP | 0350457 A2 | 1/1990 | |
| FR | 2387703 A1 | 11/1978 | |
| GB | 2228221 A | 8/1990 | |
| JP | S54159375 A | 12/1979 | |
| KR | 101882096 | 7/2018 | |
| WO | WO-2020097001 A1 | 5/2020 | |
| WO | WO-2020097007 A1 | 5/2020 | |

OTHER PUBLICATIONS

WO 2006/074880A1, Hainzinger et al. Jul. 2006.*
"Sales Brochure," actoolsupply.com, accessed Sep. 2018, 2 pages.
Application and File History for U.S. Appl. No. 16/247,211, filed Jan. 14, 2019.Inventors: Brochman.
Search Report and Written Opinion mailed Mar. 9, 2020, for PCT Application No. PCT/US2019/059750, 12 pages.
Search Report mailed Mar. 24, 2020, for PCT Application No. PCT/US2019/059759, 3 pages.
Written Opinion mailed Mar. 24, 2020, for PCT Application No. PCT/US2019/059759, 5 pages.
Youtube, "Tube Bender," Oct. 31, 2-14, retrieved from https://www.youtube.corn/watch?v=ScsGGM689vs, on Apr. 20, 2020, 2 pages.
Application and File history for U.S. Appl. No. 16/566,460, filed Jul. 16, 2020. Inventor: Brochman.
Electric bender Robend 4000 set Rothenberger Robend accessed Dec. 14, 2020, 3 pages.
Portable Cyclone Gardner Bender Portable Cyclone accessed Dec. 14, 2020, 4 pages.
Teal Corporation Bending REMS Curvo accessed Dec. 14, 2020, 5 pages.
PCT International Search Report for PCT/US2020/099341 filed Dec. 21, 2020, mailed Apr. 13, 2021, 3 pages.
PCT Written Opinion of the ISA for PCT/US2020/099341 filed Dec. 21, 2020, mailed Apr. 13, 2021, 6 pages.

* cited by examiner

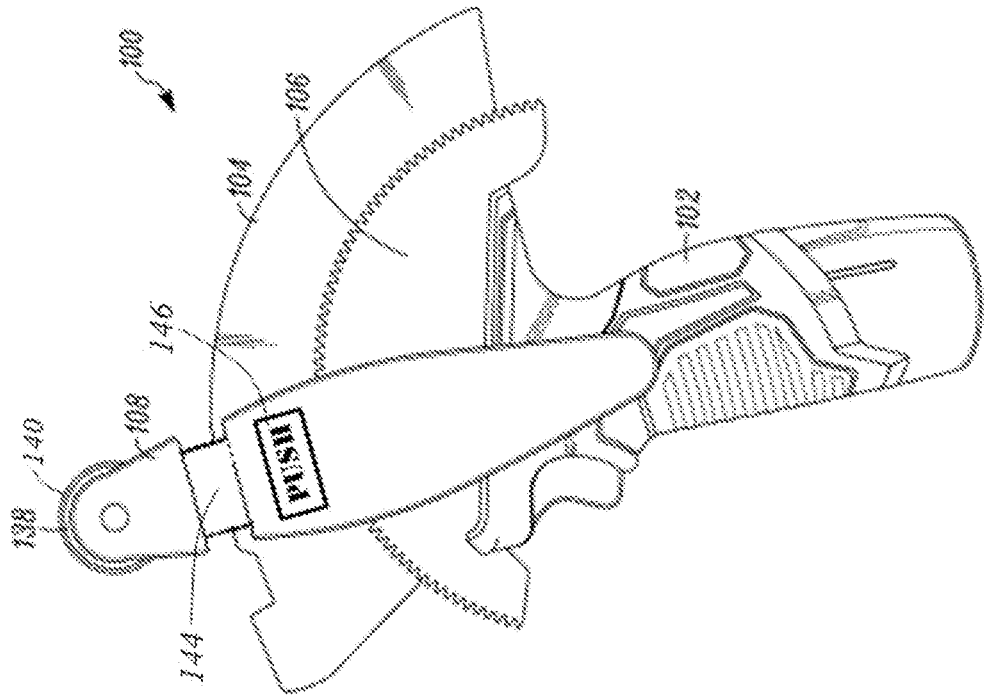
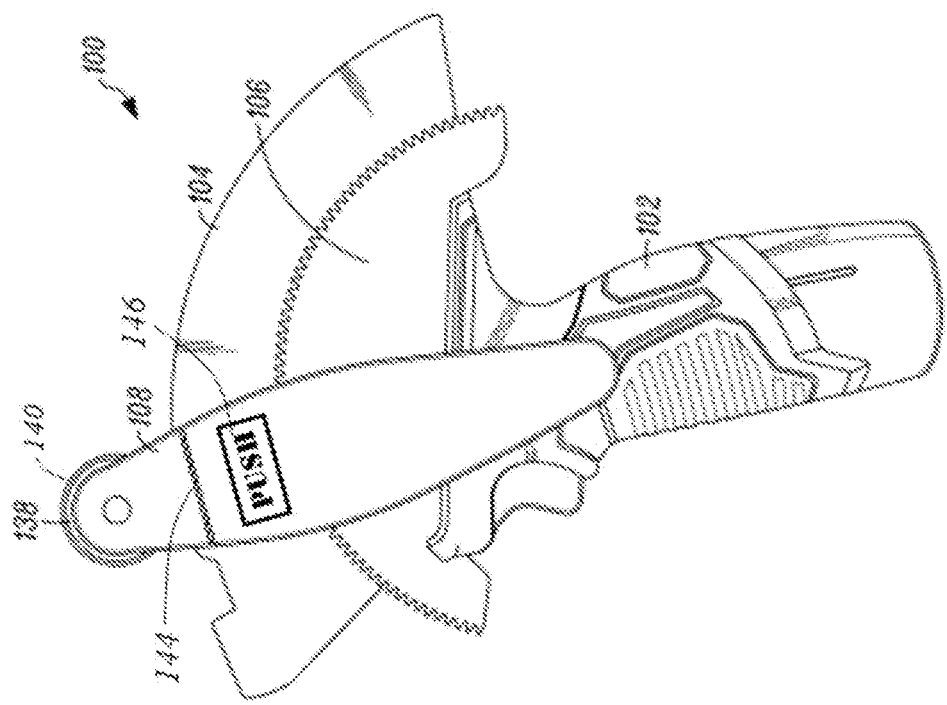

TUBING BENDER

CROSS-REFERENCE TO RELATED APPLICATIONS

The present application is a National Phase entry of PCT Application No. PCT/US2020/066341, filed Dec. 21, 2020, which claims the benefit of U.S. Provisional Application Nos. 62/954,244 (filed Dec. 27, 2019) and 63/001,905 (filed Mar. 30, 2020), and U.S. Utility application Ser. No. 16/875,481 (filed May 15, 2020), the contents of which are hereby incorporated herein by reference in their entireties.

TECHNICAL FIELD

The present invention relates generally to hand-held power tools, and more particularly to lightweight, portable, battery-powered, tools with multiple applications, including the bending of conduit or other types of tubing.

BACKGROUND

Electrical conduit is a thin-walled tubing used to protect and route electrical wiring in a building or structure. Electrical conduit, often in the form of Electrical Metallic Tubing (EMT), is constructed of straight elongated sections of corrosion resistant galvanized steel of about 3 meters (10 feet) in length, with a diameter of between about 1.2 cm (½ inch) and about 10 cm (4 inches). For example, EMT with standard trade size designations from 1.2 cm (½ inch) to 10 cm (4 inches) is commonly installed by electricians at electrical equipment installation sites in compliance with the U.S. National Electric Code (NEC) and other building codes.

Prior to installation, it is often necessary to bend the conduit. This can be accomplished with a manually operated tool known as a conduit bender, which provides a desired bend in the conduit without collapsing the conduit walls. A typical conduit bender includes a handle and a head. The head is generally a one-piece construction, including an arcuate shoe with a lateral concave channel for supporting the conduit. A hook is generally formed into the head proximate to one end of the channel for engaging a portion of conduit received in the channel. The handle, which is generally about 1 meter (3 feet) long, is secured to the head and is generally positioned in a radial line relative to the arcuate shoe. Such manually operated conduit benders are commonly produced by companies such as Benfield Electric Co., Gardner Bender, Greenlee Tools, Ideal Industries, Klein Tools, and NSI Industries, among others.

To bend the conduit, a length of conduit is positioned on a supporting surface, such as the ground, with a portion of the conduit positioned within the channel of the arcuate shoe, such that the hook of the conduit bender engages the conduit. The handle is then forced to roll the shoe onto the conduit, thereby bending the conduit to fill in the arcuate channel. Accordingly, the use of a manually operated conduit bender requires a stable work surface, as well as space sufficient to manipulate the handle relative to the conduit. For larger size conduit, such as EMT with a designated standard size of about 2.6 cm (1 inch) or greater, the bending may be assisted by an electric, hydraulic or pneumatic motor. Various heavy-duty wheeled or bench mounted benders are produced by companies such as Gardner Bender and Greenlee Tools, among others.

Recent advances in conduit bending have seen an introduction of portable powered conduit benders. Various examples of such powered benders are disclosed in U.S. Pat. Nos. 7,900,495; 9,718,108 and U.S. Patent Publication No. 2009/0188291, assigned to Husky Tools, Inc. Another example of a bending apparatus is disclosed in U.S. Patent Publication No. 2008/0190164.

Installations frequently require the conduit to be routed along the ceiling or parts of a building structure that are normally out of reach when standing on the ground. In such instances, it is common to use a ladder or a lift to safely access the intended conduit route. Without a stable horizontal work surface, it is difficult to operate a manual conduit bender. Further, according to Occupational Safety and Health Administration (OSHA) requirements, electricians must maintain three points of contact on the ladder at all times (e.g., two hands and a foot, or two feet and a hand). Accordingly, most electricians bend conduit on the ground before ascending to the installation location. If it is determined that additional bending is required, the electrician may have to descend back to the ground to conduct additional bending. In some instances, multiple ascents and descents are required to complete the electrical routing, all of which can significantly add to the time and expense of the electrical conduit installation. The present disclosure addresses these concerns.

SUMMARY OF THE DISCLOSURE

The present disclosure provides a compact, lightweight, self-powered, portable, handheld tubing bender system and method of use, thereby enabling the system and method to be held and operated with one hand. A significant reduction in size, particularly in comparison to conventional bending systems, is provided through the inclusion of a motor and reductive gearbox on a pivotable guide frame positioned alongside of a bender shoe and configured to generally pivot along an arc parallel to an arcuate channel defined by the bender shoe. Conventional powered bending systems of the prior art generally rely on a stationary motor and reductive gearbox to rotate an arcuate channel of a bender shoe relative to a heavy fixed frame or housing. By instead using the bender shoe as the fixed frame and rotating the motor and reductive gearbox relative to and alongside the bender shoe a separate heavy fixed frame or housing can be elemental. Doing so enables construction of a much more compact tubing bender system. Especially desirable embodiments of the present disclosure provide a handheld, battery powered motorized tubing bender having a rotatable bearing wheel configured to pivot around a fixed bender shoe.

A further advantage of the portable tubing bender disclosed herein is the ability to bend tubing where a first end of the tubing is fixed in position relative to an installation environment, and without a need to translate or rotate a handle portion of the tubing bender during bending operations. That is, once the tubing bender is positioned relative to the tubing, the bending operations can commence, and the handle (and user grip) can remain fixed in position relative to the installation environment, thereby enabling ease and use, particularly when working in a confined area, overhead, or where the reach of the user may be limited (e.g., on a ladder).

One embodiment of the present disclosure provides a portable tubing bender, including a portable housing, a bender shoe, a guide gear and a guide frame. The portable housing can include a handle portion. The bender shoe can be operably coupled to the portable housing and can define an arcuate channel configured to restrain a length of tubing along a prescribed arc during bending operations. The guide gear can be fixedly coupled to the bender shoe, and can define an arcuate guide path alongside the arcuate channel. The guide frame can be pivotably coupled to the bender shoe, and can include a motor, a driven gear and a guide member. The motor can be configured to drive the driven gear along the guide gear to pivot the guide frame relative to the bender shoe, so as to move the guide member during bending operations to guide the length of tubing along the arcuate channel of the bender shoe.

In one embodiment, the arcuate channel of the bender shoe is configured to receive at least one of Electrical Metallic Tubing (EMT), Rigid Metal Conduit (RMC), Intermediate Metal Conduit (IMC), PVC coated rigid metal conduit, copper tubing, aluminum tubing, stainless steel tubing, tubing used for HVAC or refrigeration systems, tubing used in elevator systems, or other types of tubing or conduit. In one embodiment, the arcuate channel of the bender shoe is configured to receive EMT of a ½-inch designated standard size. In one embodiment, the arcuate channel of the bender shoe is configured to receive EMT of a ¾-inch designated standard size. In one embodiment, the bender shoe is a combination bender shoe defining a plurality of arcuate channels shaped and sized to receive tubing of different diameters. In one embodiment, the bender shoe is configured to pivot relative to the portable housing. In one embodiment, the tubing bender further includes a rechargeable battery configured to power the motor. In one embodiment, the guide frame is configured to complete a 90° bend in less than 10 seconds.

In one embodiment, the output speed of the motor is variable. In one embodiment, the bender shoe includes markings configured to indicate a bend angle of the length of tubing during bending operations. In one embodiment, the portable tubing bender further includes a sensor configured to sense an angular position of the guide frame relative to the bender shoe. In one embodiment, the portable tubing bender includes a programmable controller configured to automatically cease operation of the motor upon reaching a desired angular position, as determined by the sensor. In one embodiment, the portable tubing bender further includes a display configured to display digital readout of an angular position of the guide member relative to the bender shoe. In one embodiment, the display further includes a user interface configured to accept a desired angular position of the guide member relative to the bender shoe.

Another embodiment of the present disclosure provides a method of using a portable tubing bender to bend tubing with a single hand. The method comprises: positioning a length of conduit between a hook and an arcuate channel defined by a bender shoe; pivoting a guide frame relative to the bender shoe, the guide frame including a motor, a driven gear and an arcuate guide gear member, the motor configured to drive the driven gear along the guide gear member fixedly coupled to the bender shoe to pivot the guide frame relative to the bender shoe, so as to move the guide member during bending operations to guide the length of tubing along the arcuate channel of the bender shoe.

Another embodiment of the present disclosure provides a portable tubing bender configured to enable a bending of tubing, where a first end of a length of tubing is fixed in position relative to an installation environment. The portable tubing bender can include a bender shoe/handle portion, handle and guide frame. The bender shoe/handle portion can define an arcuate channel configured to restrain a length of tubing along a prescribed arc during bending operations. The guide frame can be pivotably coupled to the bender shoe, and can be configured to pivot relative to the bender shoe during bending operations to guide a portion of the length of tubing along the arcuate channel of the bender shoe, wherein the bender shoe and handle portion remain fixed in position relative to the installation environment during bending operations.

Another embodiment of the present disclosure provides a method of bending tubing, comprising: positioning a length of tubing between a hook and arcuate channel defined by a bender shoe; and pivoting a guide frame relative to the bender shoe to guide the length of tubing along the arcuate channel of the bender shoe, where in the bender shoe remains fixed in position relative to an installation environment during bending operations.

Another embodiment of the present disclosure provides a reduced length portable tubing bender, including a handle portion, a bender shoe/guide gear, and a guide frame. The bender shoe/guide gear can be operably coupled to the handle portion. The bender shoe can define an arcuate channel configured to restrain length of tubing along a prescribed arc during bending operations. The guide gear can define a central aperture positioned on the handle portion. The guide frame can be pivotably coupled to the bender shoe and can be configured to pivot relative to the bender shoe about the central aperture, so as to guide the length of tubing along the arcuate channel of the bender shoe.

Another embodiment of the present disclosure provides a handheld battery-powered, low RPM, high torque tool. The low RPM, high torque tool can include a housing, rechargeable battery, brush or brushless direct-current motor, movable spindle (also referred to as one or more outputs), and reductive gearbox. The housing can include a body and a handle portion. The rechargeable battery can be removably couplable to the housing. The motor can be powered by the rechargeable battery and can be configured to produce a rotational output. The movable spindle can be configured to support a tool element. The reductive gearbox can operably couple the motor to the movable spindle in a manner that reduces the rotational output of the electric motor to a maximum spindle rotational output of about 2 RPM or less, with an output torque of at least about 90 foot-pounds. It is also contemplated that the output can be greater than 2 RPM, but far less than outputs of comparable cordless drills in the market. It is further contemplated that the output torque can be much greater than 90 foot-pounds, for example, in one embodiment the output torque can be in a range of between about 100 foot-pounds and about 2000 foot-pounds.

Various tool elements can be operably coupled to the movable spindle. One example embodiment of a tool element includes a conduit bender. Other tool elements can include a heavy-duty riveter, metal working brake, sheathing/flashing brake, crimper, body shop panel gatherer, replacement for a vise, hydraulic press, millwright application (configured to move heavy objects in small increments), lift jack, spreader tool (similar to a jaws of life), replacement for air tools, welding clamp, vice grip, clippers, tree trimmer, wire cutter, crimping tool, rebar cutter, PVC tubing cutter, steel punch, threaded rod cutter, and portable power take off shaft; other tool elements are also contemplated.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 6A is a left-side view depicting a portable tubing bender including an adjustable distance bearing wheel in a first position, in accordance with an embodiment of the disclosure.

FIG. 6B is a left-side view depicting the portable tubing bender of FIG. 8 in a second position.

Figure 1:
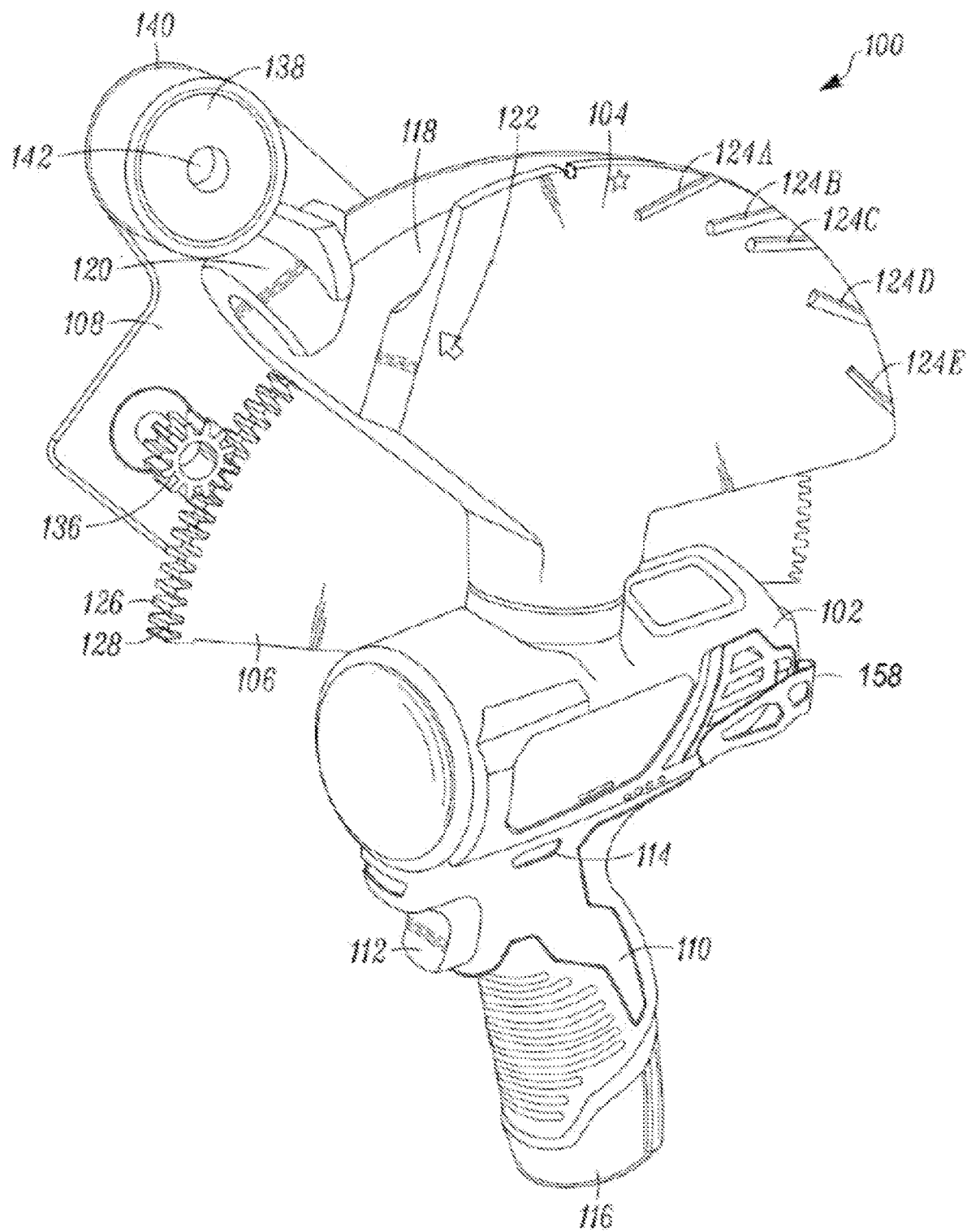
FIG. 1 is a perspective view depicting a portable tubing bender, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Figure 2B:
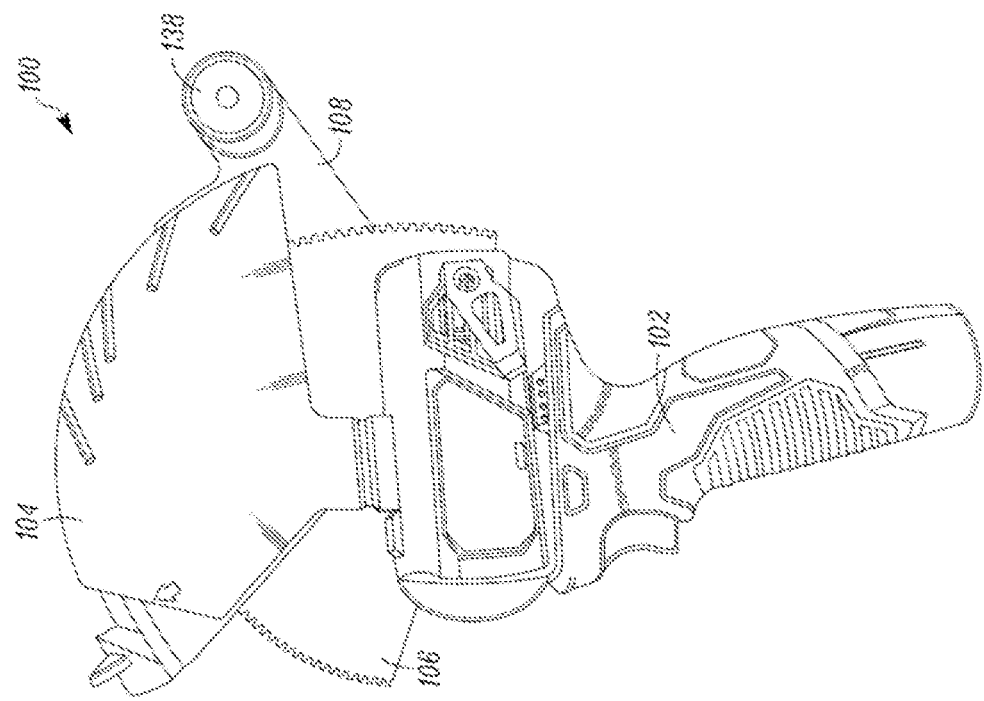
FIG. 2B is a left-side view depicting the portable tubing bender of FIG. 2A, with the guide frame in a second position.
Figure 2A:
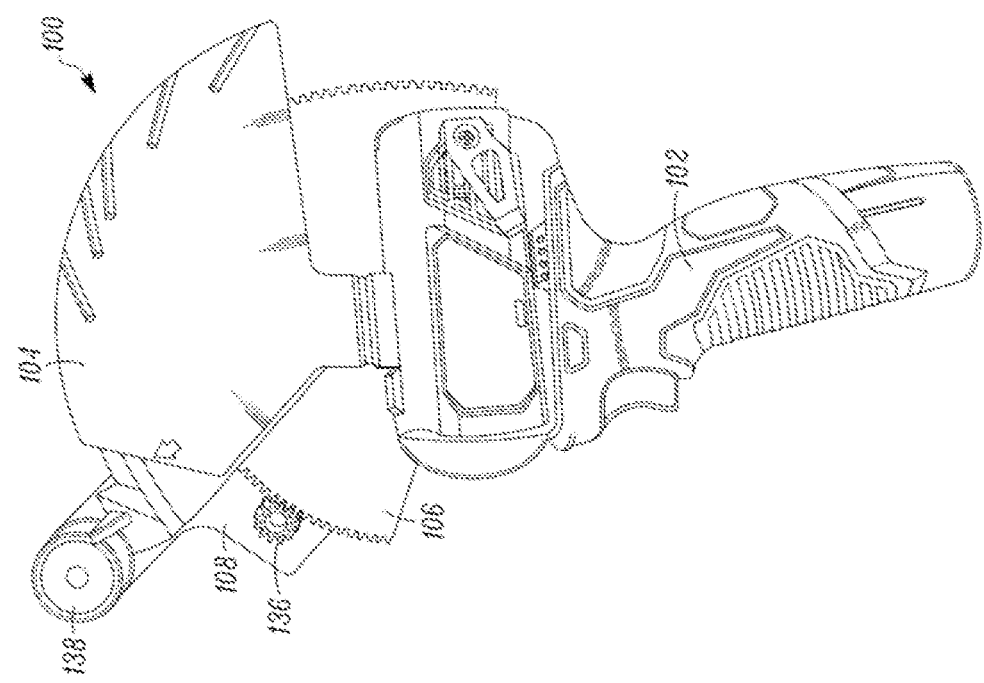
FIG. 2A is a left-side view depicting the portable tubing bender of FIG. 1, with a guide frame in a first position.
Figure 3:
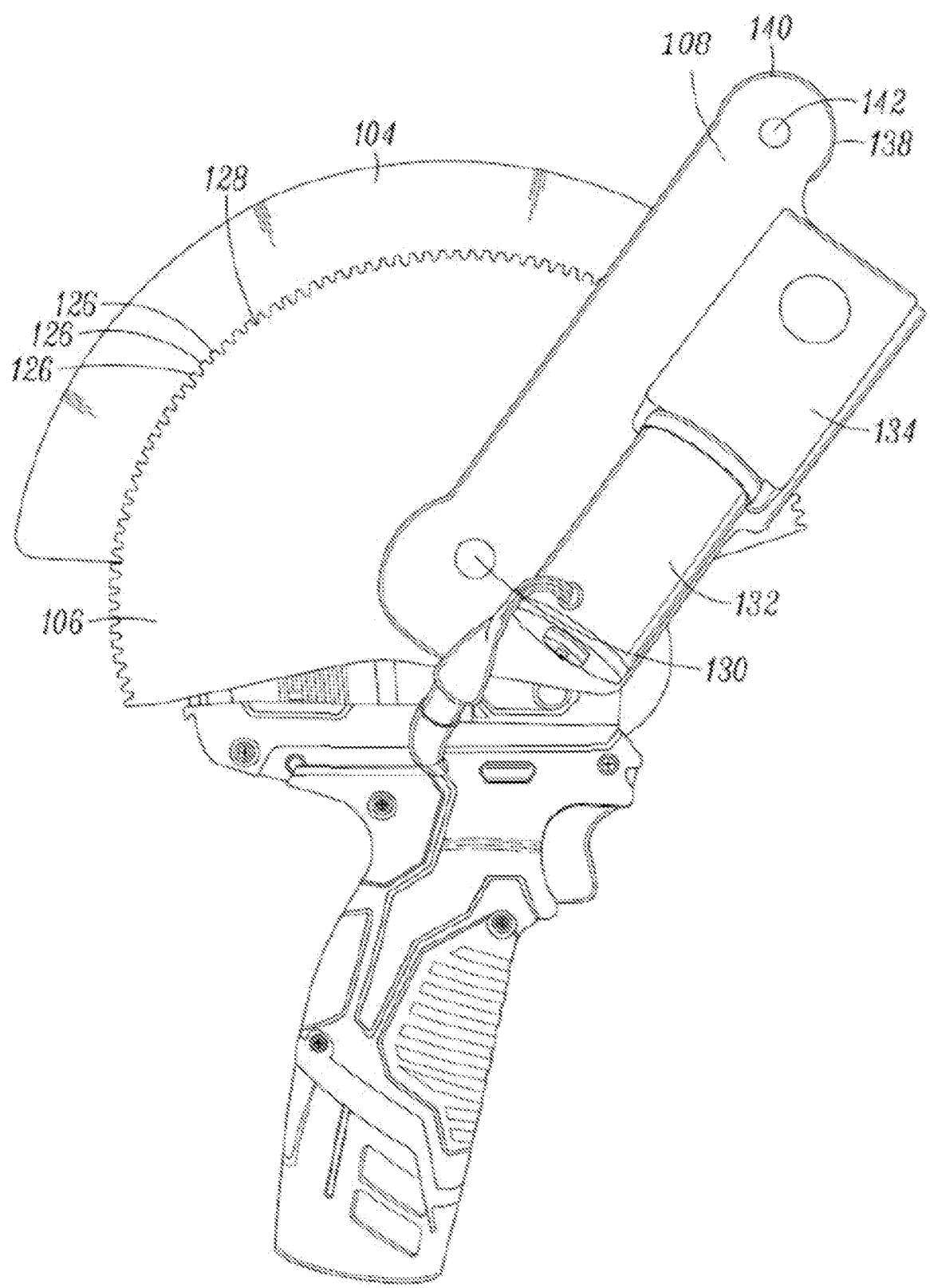
FIG. 3 is a right-side view depicting the portable tubing bender of FIG. 1.

Referring to FIGS. 1-3, a portable tubing bender 100 is depicted in accordance with an embodiment of the disclosure. The portable tubing bender 100 can be configured to enable a user to bend tubing or conduit, such as Electrical Metallic Tubing (EMT), Rigid Metal Conduit (RMC), Intermediate Metal Conduit (IMC), PVC coated rigid metal conduit, copper tubing, aluminum tubing, stainless steel tubing, tubing used for HVAC or refrigeration systems, tubing used in elevator systems, or other types of tubing or conduit, with one hand, for example while standing on a ladder with two feet and grabbing the ladder with the other hand. The tubing bender 100 can be configured to bend tubing or conduit of a number of standard trade size designations (e.g., 0.6 cm (¼ inch), 1 cm (⅜ inch), 1.2 cm (½ inch), 1.9 cm (¾ inch), 2.5 cm (1 inch), 3.2 cm (1¼ inch), 3.8 cm (1½ inch), 5 cm (2 inch), 6.3 cm (2½ inch), 7.6 cm (3 inch), 8.9 cm (3½ inch), 10.2 cm (4 inch, etc.), or generally conduit having a diameter of between about 0.6 cm (¼ inch) and about 10.2 cm (4 inches). The tubing bender 100 can be configured to bend the conduit through a range of angles between about 0° and about 180° over a time span of up to about 60 seconds, depending upon the bend angle desired.

In one embodiment, the portable tubing bender 100 can include a housing 102, a bender shoe 104, a guide gear 106, and a guide frame 108. The housing 102 can generally include a handle portion 110 configured to enable a user to grip and manipulate the tubing bender 100 during use. The housing 102 can further include a trigger 112, forward/reverse switch 114, and other input mechanisms configured to affect user control and manipulation of the guide frame 108 during bending operations. In some embodiments, the housing 102 can be configured to receive a power source 116, such as a rechargeable battery. For example, in one embodiment, the battery can be a rechargeable, lithium-ion, having a displacement volume of less than about 125 cc (7.5 cubic inches) with a capacity of about 2 to about 9 amperes. In one embodiment, the power source 116 can have a nominal output voltage of between about 12 volts and about 18 volts, although other battery capacities and sizes (e.g., about 20 volts, about 24 volts, about 36 volts, about 40 volts, etc.) are also contemplated.

In general, the housing 102 can serve as a lightweight, compact mechanism configured to provide a grip for the bender shoe 104, which in turn serves as a fixed frame of reference around which the guide frame 108 pivots during bending operations. For example, with reference to FIGS. 2A-B, during bending operations, the guide frame 108 can pivot from a first position (as depicted in FIG. 2A) to a second position (as depicted in FIG. 2B). It is to be noted that the positions depicted in FIGS. 2A-B may represent intermediate positions between an initial or starting position when commencing a bend, and a final or completed position after the desired bend angle of tubing positioned in the bender shoe has been achieved.

Various embodiments of the housing 102 are contemplated. In one embodiment, the housing 102 can be a portion of an existing cordless driver, for example, a cordless driver produced by companies and under trademarks such as STANLEY BLACK & DECKER (e.g., DEWALT, STANLEY, BLACK & DECKER, BOSTITCH, CRAFTSMEN, VIDMAR, MAC TOOLS, IRWIN, LENOX, PROTO, PORTER-CABLE, POWERS FASTENERS, LISTA, SIDCHROME, EMGLO, and USAG), TECHTRONICS INDUSTRIES CO. LTD. (e.g., MILWAUKEE ELECTRIC TOOL CO., RYOBI, RIDGID, EMPIRE LEVEL, HOOVER, DIRT DEVIL, ORRICK, STILETTO TOOLS, HEART TOOLS, HOME LIFE, VAX, and AEG), CHEVRON (e.g., EGO, SKILSAW, SKIL, FLEX, DEVON, XTRON, CALMDURA, AND KOBALT), BOSCH (E.G., BOSCH, FREUD, DIABLO, DREMEL, ROTOZIP, VERMONT AMERICAN, and CST/BERGER), HUSQVARNA (e.g., HUSQVARNA, POULAN PRO, WEED EATER, JONSORED, KLIPPO, ZENOAH, GARDENA, DIAMANT BOART, FLYMO, and MCCULLOCK), JPW INDUSTRIES (e.g., JET, POWERMATIC, WILTON, EDWARDS, PROMAC, TOOL AIR, and GYS), APEX TOOL GROUP (e.g., WELLER, WISS, GEARWRENCH, CRESCENT, LUFKIN, JOBOX, APEX, CAMPBELL, NICHOLSON, JACOBS, XCELITE, MASTER POWER, BELZER, HKP, SATA, DOTCO, and CLECO), AND EMERSON (e.g., RIDGID, GREENLEE, INSINKERATOR, EMERSON, SENSI, PROTEAM, and KLAUKE), among others. It is noted that the use of one or more components of an existing cordless driver for the production of a portable tubing bender 100 has the effect of significantly reducing the design and manufacturing efforts necessary for production of embodiments of the present disclosure by one of the aforementioned companies.

The bender shoe 104 can be operably coupled to the housing 102. As depicted in FIG. 1, the bender shoe 104 can define an arcuate channel 118 configured to restrain a length of tubing along a prescribed arc during bending operations. For example, the arcuate channel 118 can define a convex arc corresponding to an NEC approved bend radius for conduit of a standard trade size. Accordingly, in one embodiment, the size of the bender shoe 104 can be specific to the size of tubing or conduit to be bent. In one embodiment, different sized bender shoes 104 can be provided for different sized conduit. In one embodiment, the arcuate channel 118 of the bender shoe 104 is configured to receive EMT of a ½-inch designated standard size. In another embodiment, the arcuate channel 118 of the bender shoe 104 is configured to receive EMT of a ¾-inch designated standard size. Arcuate channels 118 configured to receive other diameters and types of tubing are also contemplated.

In one embodiment, the bender shoe 104 can be constructed of a lightweight, rigid material, such as a high-strength plastic or composite, although other materials such as aluminum, magnesium, titanium, and steel are also contemplated. For further weight savings, in some embodiments, the bender shoe 104 can include material cutouts or webbing (not depicted), configured to reduce the overall weight of the bender shoe 104 by removing material unnecessary for support and function of the bender shoe 104. With continued reference to FIG. 1, in some embodiments, the bender shoe 104 can further include a hook 120 configured to engage tubing received within the arcuate channel 118.

In one embodiment, the bender shoe 104 can optionally include markings 122 and 124A-E configured to indicate a bend angle of the tubing relative to the bender shoe 104. For example, the markings 122 can optionally include an arrow (A) to be used with stub, offset or outer marks of saddle bends, as well as a degree scale depicting common bend angles (e.g., 10°, 22.5°, 30°, 45°, 60°, etc.) for offset and saddle bends. Other markings can include a rim notch configured to aid in locating the center of a saddle bend, and a star configured to indicate the back of a 90° bend (as depicted in FIG. 1).

Figure 4:
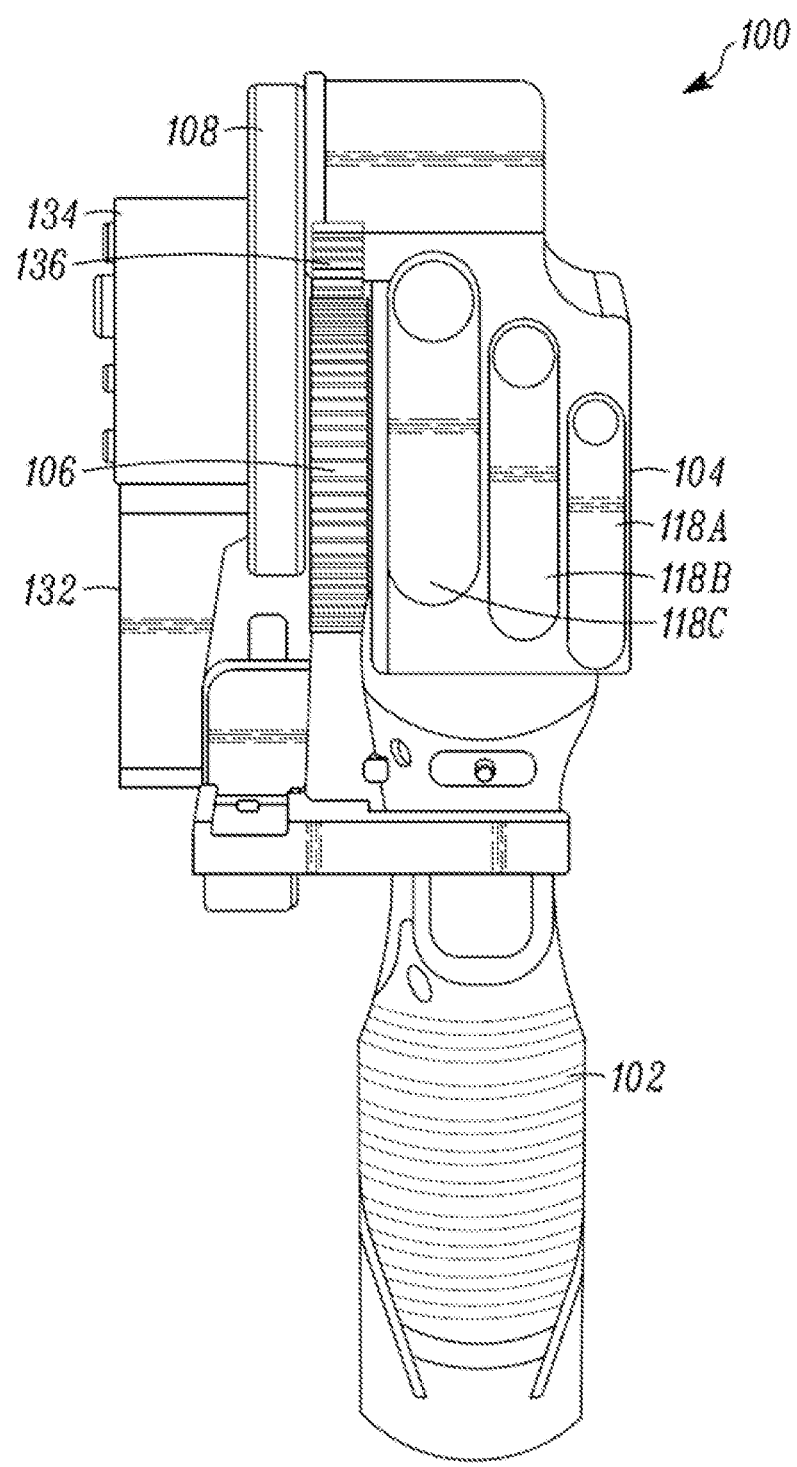
FIG. 4 is a front view depicting a portable tubing bender including a combination bender shoe, in accordance with an embodiment of the disclosure.

Referring to FIG. 4, a combination bender shoe 104 having two or more arcuate channels positioned abreast of one another is depicted in accordance with an embodiment of the disclosure. The combination bender shoe 104 can define a plurality of arcuate channels 118A-C shaped and sized to receive the cross-sections of tubing or conduit of a respective plurality of standard trade sizes. In the example embodiment depicted in FIG. 4, the arcuate channels 118A-C are configured to receive copper tubing having diameters of 6 mm, 8 mm, and 10 mm respectively. In other embodiments, the combination bender shoe 104 can include a first arcuate channel 118A configured to receive ½-inch EMT, and a second arcuate channel 118B configured to receive ¾-inch EMT, and a third arcuate channel 118C configured to receive 1-inch EMT. Other configurations, including a bender shoe 104 having four or more arcuate channels configured to receive tubing of different diameters, are also contemplated.

Figure 5B:
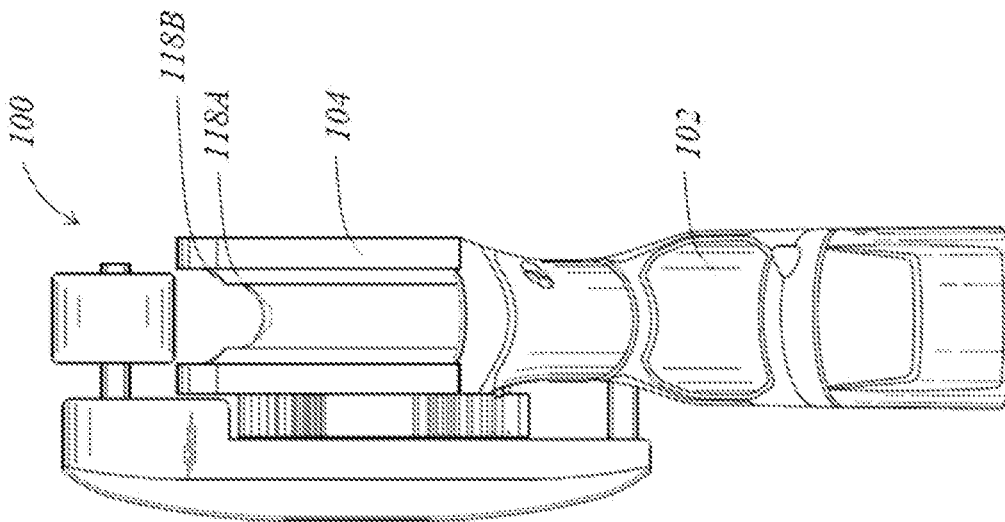
FIG. 5B is a rear side view depicting the portable tubing bender of FIG. 5A.
Figure 5A:
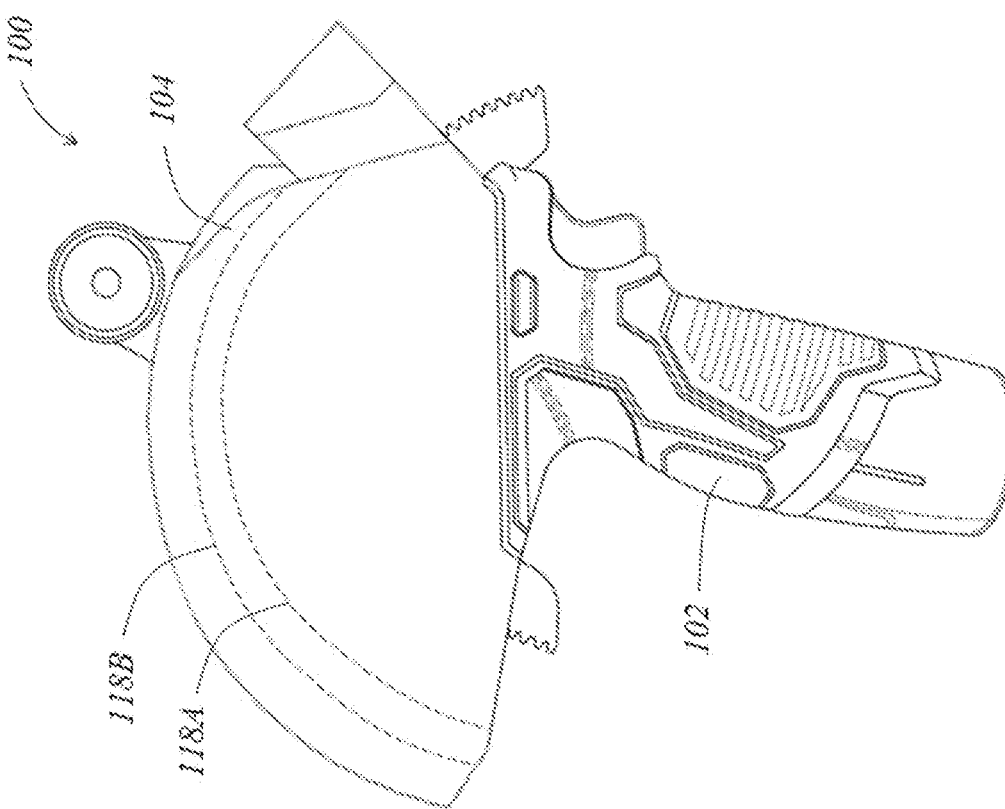
FIG. 5A is a right-side view depicting a portable tubing bender including a combination bender shoe, in accordance with an embodiment of the disclosure.

Referring to FIGS. 5A-B, a combination bender shoe 104 having two or more nested arcuate channels is depicted in accordance with an embodiment of the disclosure. The combination bender shoe 104 can define a plurality of stacked or nested arcuate channels 118A-B, thereby providing a combination bender shoe 104 configured to receive the cross-sections of tubing or conduit of a plurality of standard trade sizes, and guide the tubing or conduit along a bend arc corresponding to the NEC approved bend radius for conduit of the respective standard trade size, without adding additional width to the bender shoe 104 like that of combination bender shoes having two or more arcuate channels positioned side-by-side (e.g., the bender shoe 104 depicted in FIG. 4). For example, in one embodiment, the combination bender shoe 104 can include a first arcuate channel 118A configured to receive ½-inch EMT, embedded within a second arcuate channel 118B configured to receive ¾-inch EMT. Other configurations, including three or more arcuate channels configured to receive tubing of different diameters, are also contemplated. Accordingly, the combination bender shoe 104 can present a lighter weight, more compact combination bender shoe, particularly in comparison to conventional combination bender shoes, such as that depicted in FIGS. 19A and 22A-23B (described in more detail below).

In one embodiment, the bender shoe 104 can be configured to pivot or rotate relative to the housing 102. For example, with reference to FIG. 17, the housing 102 can include a locking pin 125 or other mechanism configured to selectively lock the bender shoe 104 in position relative to the housing 102. Manipulation of the locking pin 125 can enable a user to selectively rotate the bender shoe 104 around a z-axis relative to the housing 102 (e.g., between about 45° and 90°) which may be beneficial when working in a confined area.

With particular reference to FIG. 3, the guide gear 106 can be fixedly coupled to the bender shoe 104. In one embodiment, the guide gear 106 can include the minimum number of teeth 126 necessary to enable the guide frame 108 to pivot through a desired range of motion. Accordingly, in one embodiment, the guide gear 106 can be configured as a sectional gear (e.g., a portion of a circular gear) representing an arc of between about 90° and about 250°, thereby presenting a weight savings over a full 360° circular gear. In one embodiment, the guide gear 106 can include an arc of teeth 126 traversing about 180° around a peripheral edge 128 of the guide gear 106 relative to a central pivot point or axle 130.

In one embodiment, the guide gear 106 can be constructed of a lightweight, rigid material, such as a high-strength plastic or composite, although other materials such as aluminum, magnesium, titanium and steel are also contemplated. In some embodiments, the guide gear 106 and the bender shoe 104 can be formed as a single, unitary component. For example, in one embodiment, the bender shoe 104 can include an arcuate groove or channel (not depicted), one edge or surface of which can define the guide gear 106. For example, a top surface of the groove can define a partial ring gear, having a plurality of teeth facing inwardly along a curved surface. In other embodiments, a bottom surface of the groove can define the guide gear.

The guide frame 108 can be pivotably coupled to the guide gear 106/bender shoe 104 to selectively pivot relative to the bender shoe 104 about the central pivot point or axle 130. The guide frame 108 can include a motor 132, an (optional) reductive gearbox 134 including a driven gear 136, and a guide member 138. In embodiments, the motor can be at least one of electrically, pneumatically, or hydraulically driven. In some embodiments, the motor 132 and reductive gearbox 134 can be positioned on one side of the guide frame 108 (e.g., opposite the bender shoe 104), while the driven gear 136 can be positioned on the other side of the guide frame 108 (e.g., adjacent to the bender shoe 104) (as depicted in FIGS. 1-3). In other embodiments, the guide frame 108 can at least partially or fully house the motor 132 and reductive gearbox 134, so as to provide a protective shroud to the motor 132 and reductive gearbox 134 (as depicted in FIGS. 6A-B). In some embodiments, the guide frame 108 can be positioned on the left side of the tubing bender 100 (as viewed by a user gripping housing 102 in its normal position). This may be more convenient for a right-handed user, as it will facilitate a line of sight view of the bender tubing. In other embodiments, the guide frame 108 can be positioned on the right side of the tubing bender 100, an orientation that may be more convenient for a left-handed user.

The motor 132 can be powered by the power source 116 and can be controlled by a plurality of inputs. For example, in one embodiment, the motor 132 can be started, stopped and otherwise controlled for variable speed, duration or both speed and duration via the trigger 112. Forward and reverse directional control of the motor 132 can be controlled via the forward and reverse switch 114. In other embodiments, one or more of actuation, speed, duration, and directional control of the motor 132 can be controlled, at least in part, by a programmable controller (as discussed in greater detail below).

The reductive gearbox 134 (occasionally referred to herein as a "transmission") can be configured to operably couple an output of the motor 132 to the driven gear 136, thereby reducing the rotational speed of the motor to a desired driven gear speed, while increasing the torque output. As discussed in further detail below, the transmission or reductive gearbox 134 can be made up of a plurality of different gearing types and configurations to achieve the desired reduction in RPM and corresponding increase in torque necessary to bend conduit. For example, in some embodiments, the reductive gear box 134 can be a multi-stage transmission with a variable speed output based on a rotational direction of the motor 132.

With specific reference to a portable tubing bender attachment, the guide member 138 can be configured to serve as a guide surface to forcibly urge tubing or conduit into the arcuate channel 118 of the bender shoe 104 during bending operations. In some embodiments, the guide member 138 can be in the form of a bearing wheel 140 received on a shaft 142. Collectively, the motor 132, driven gear 136 and guide member 138 can be operably coupled to the guide frame 108, which can be configured to pivot about the central pivot point or axle 130. Accordingly, the motor 132 can be configured to drive the driven gear 136 along the guide gear 106 to pivot the guide frame 108 relative to the guide gear 106/bender shoe 104, so as to move the guide member 138 during bending operations to guide the tubing along the arcuate channel 118 of the bender shoe 104 during bending operations. In some embodiments, the guide member 138 can include a concaved groove or channel to support the tubing or conduit as it is bent, in other embodiment, the guide member 138 can have a flat surface to accommodate tubing or conduit of a variety of sizes.

With reference to FIG. 6A-B, in some embodiments, the portable tubing better 100 can optionally include a bearing wheel adjustment mechanism 144 for adjusting a distance of the bearing wheel 140 from the bender shoe 104. For example, in some embodiments, a position of the bearing wheel 140 relative to the housing 102 or bender shoe 104 can be adjusted by manipulating a locking device 146 and manually positioning the bearing wheel 140 at a desired distance from the bender shoe 104. In other embodiments, a position of the bearing wheel 140 relative to the bender shoe 104 can be adjusted by a driver (not depicted), such as an electric motor, like that disclosed in PCT Application Serial No. PCT/US2019/059750, the contents of which are hereby incorporated by reference herein.

Figure 7:
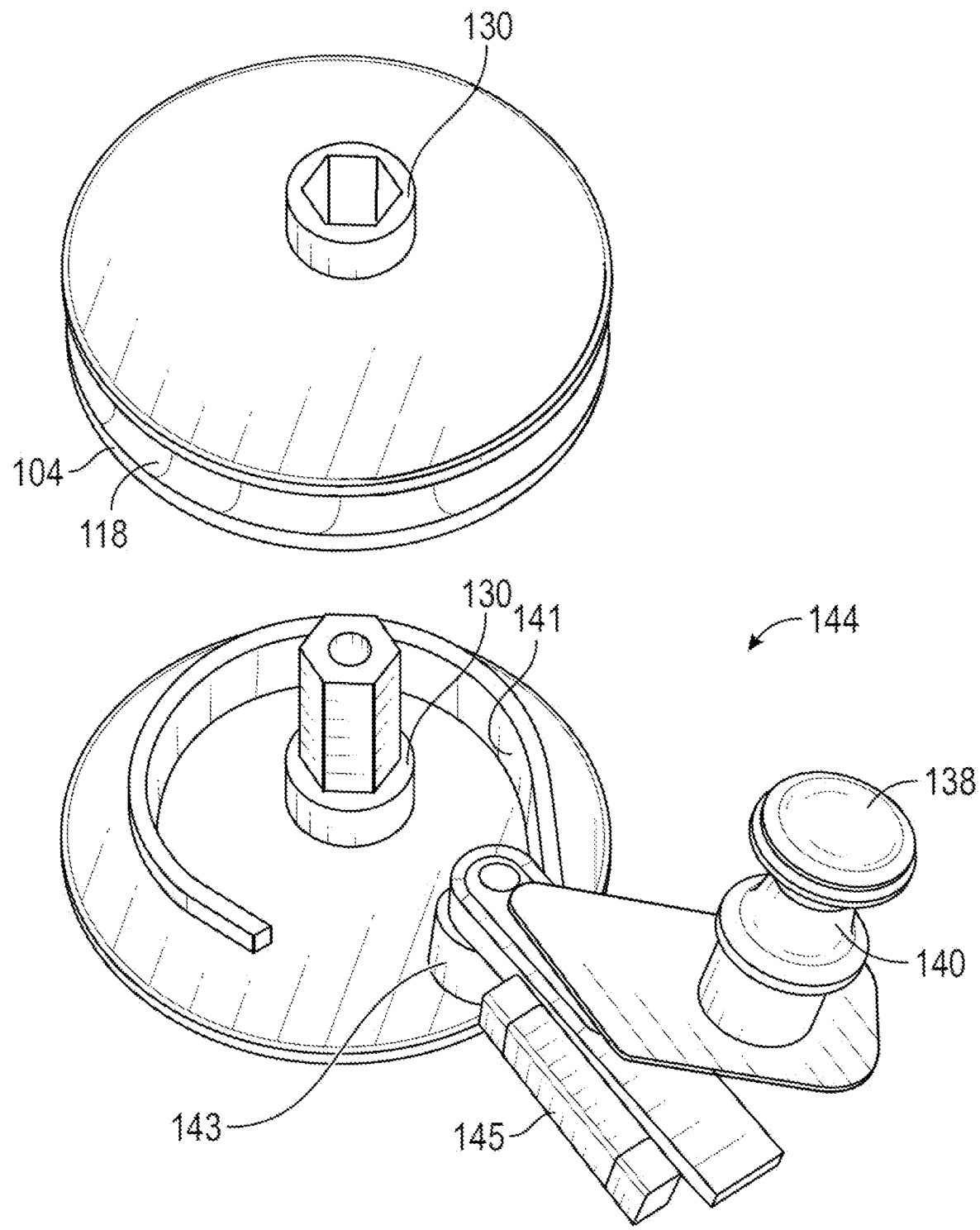
FIG. 7 is a perspective view of a cam and cam follower bearing wheel adjustment mechanism, in accordance with an embodiment of the disclosure.

In another embodiment, a position of the bearing wheel 140 relative to the bender shoe 104 can be adjusted by a cam and follower mechanism as the bearing wheel 140 rotates relative to the bender shoe 104. For example, as depicted in FIG. 7, in one embodiment, a cam shaped ridge 141, channel or other structure can be formed around the central aperture 130 (e.g., on or in a surface of the bender shoe 104). A cam follower 143 (e.g., in the form of a roller) operably coupled to the guide member 138 (e.g., in the form of a bearing wheel 140) can be positioned on the inside of the cam shaped ridge 141. In some embodiments, a biasing member 145 (e.g., a compression spring) can be configured to generally bias a cam follower 143 away from the central aperture 130.

In operation, as the guide member 138 rotates relative to the central aperture 130, the cam follower 143 traversing along the cam shaped ridge 141 can cause an adjustment of the position of the guide member relative to the central aperture 130 (e.g., interaction between the cam follower 143 and the cam shaped ridge 141 can pull the guide member 138 towards the central aperture 130 to counteract a bias of the biasing member 145. Accordingly, in some embodiments, the bearing wheel adjustment mechanism 144 can be configured to enable ease in loading and unloading tubing into and out of an arcuate channel 118 of the bender shoe 104 at the corresponding beginning and end of bending operations by providing an increased gap or distance between the guide member 138 and the bender shoe 104 in an initial loading/unloading or home position. As bending commences, rotation of the guide member 138 relative to the bender shoe 104 can drive the guide member 138 in closer proximity to the bender shoe 104 to ensure that the bend affected in the conduit follows the arcuate channel 118.

Figure 8:
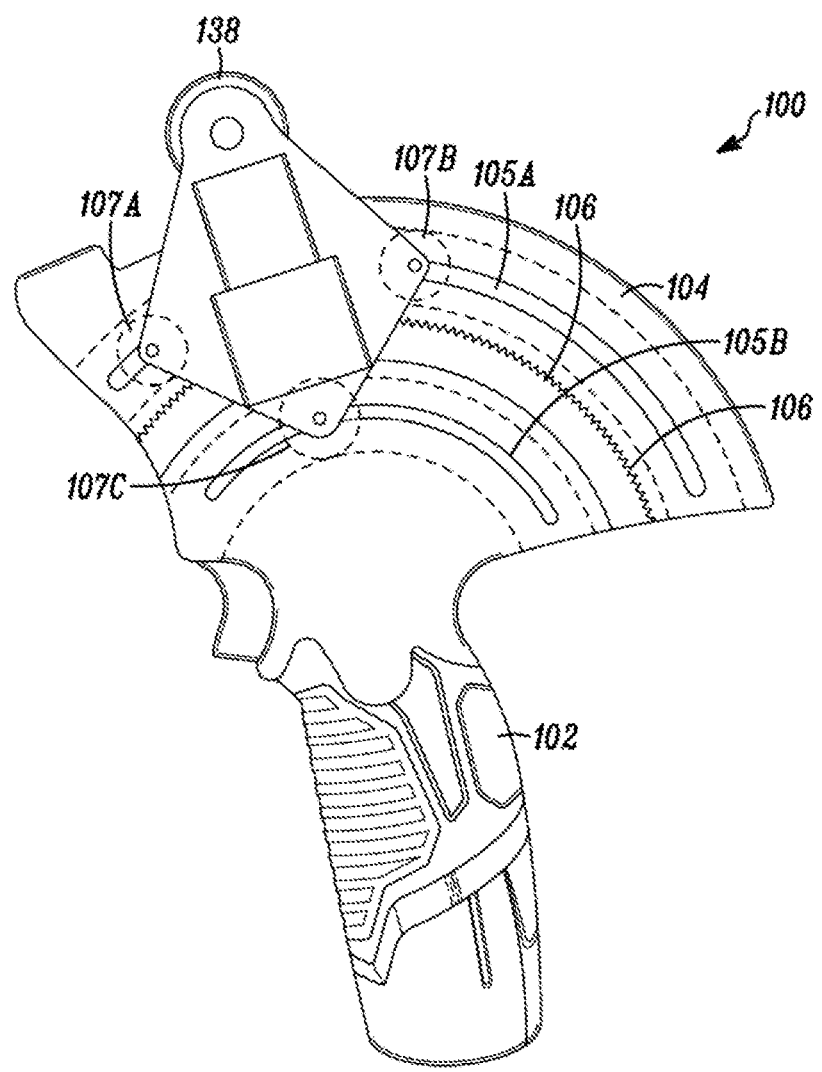
FIG. 8 is a left-side view depicting a portable tubing bender including a bender shoe defining a curved track along which a guide frame can traverse, in accordance with an embodiment of the disclosure.
Figure 9A:
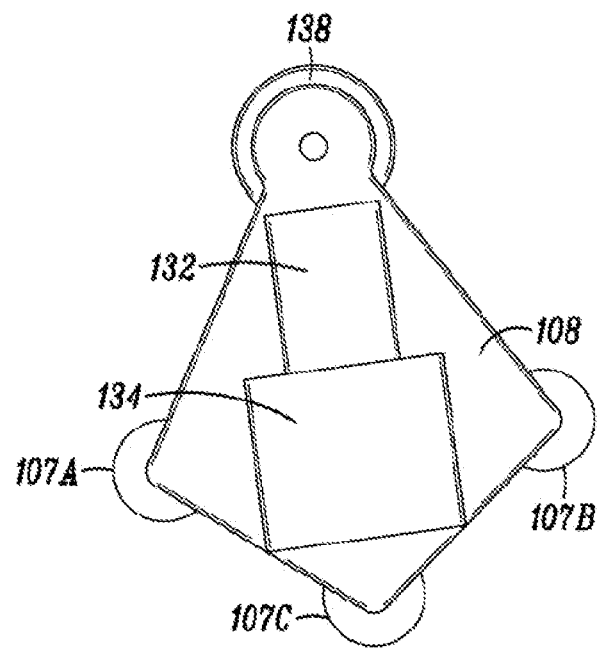
FIG. 9A is a close-up view depicting the guide frame of FIG. 8.
Figure 9B:
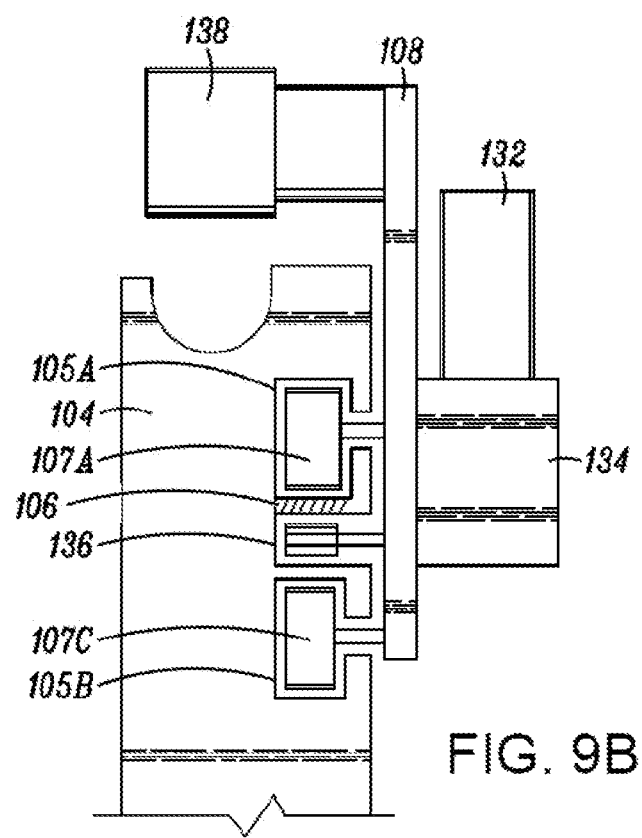
FIG. 9B is a partial, cross sectional view depicting the bender shoe and guide frame of FIG. 8.

In another embodiment, the guide member 138 can be radially restrained with respect to the bender shoe 104, without the need for a pivotable linkage connection between the guide frame 108 and a central pivot point or axle 130 of the bender shoe 104 such as that depicted in FIGS. 1-6B. For example, with reference to FIGS. 8-9B, in one embodiment, the guide frame 108 can include a plurality of guide wheels 107A-C configured to traverse along one or more curved guide wheel tracks or channels 105A/B defined within the bender shoe 104. In such embodiments, the guide gear 106 can be formed as a partial ring gear along which the driven gear 136 can traverse, thereby providing a motive force for the guide frame 108 to move along the curved guide wheel channels 105A/B via the guide wheels 107A-C. A motor 132 and reductive gearbox 134 operably coupled to the guide frame 108 can provide rotational power to the driven gear 136. Accordingly, in some embodiments, a further weight savings can be provided through an integrally molded curved guide wheel track 105A/B, thereby eliminating the need for a linkage member pivotably coupling the guide frame 108 to the bender shoe 104.

Figure 10:
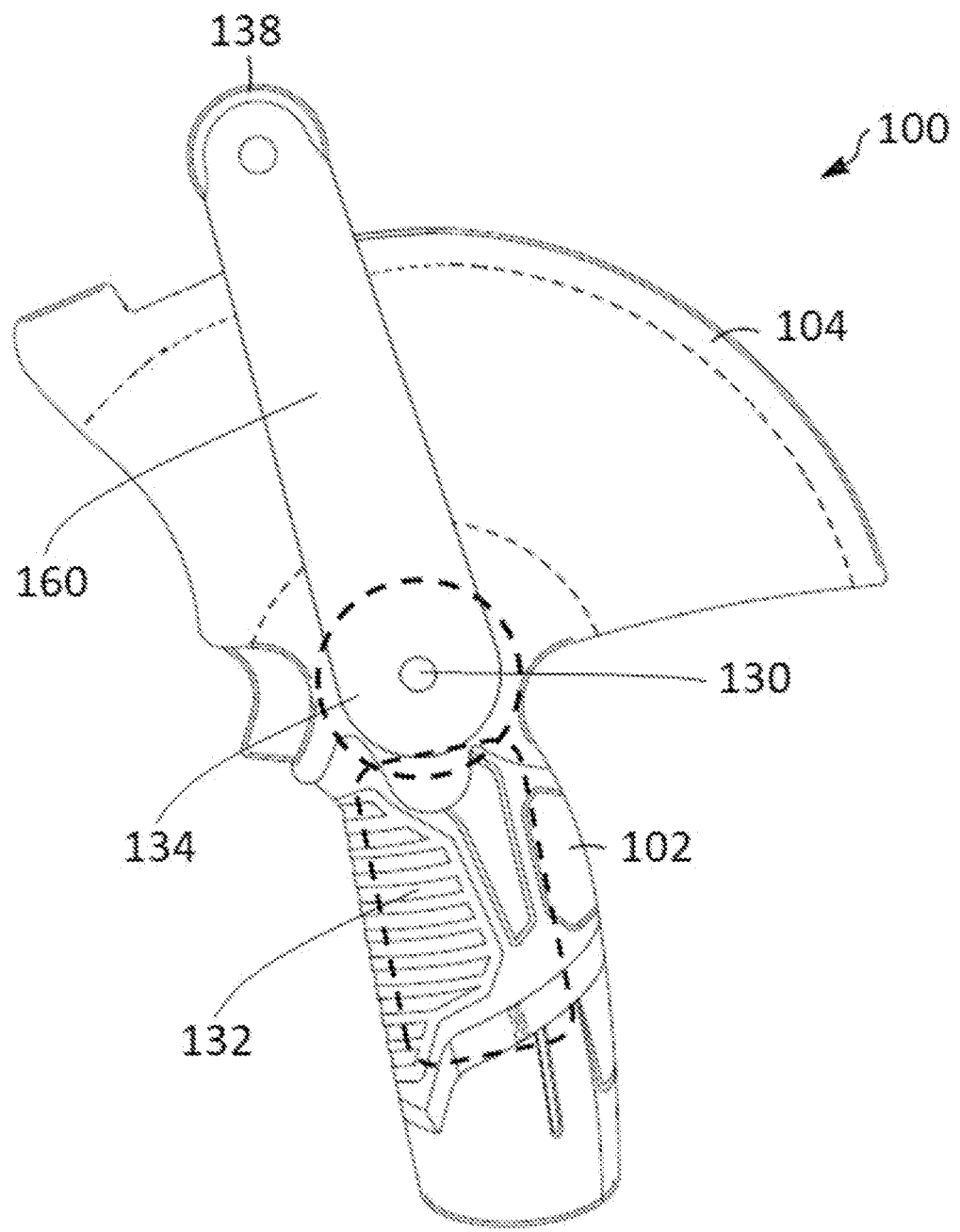
FIG. 10 is a left-side view depicting a portable tubing bender, in accordance with an embodiment of the disclosure.

In another embodiment, the guide member 138 can be radially restrained with respect to the bender shoe 104 via a pivotable linkage connection 160 extending between a central aperture 130 and the guide member 138. For example, with reference to FIG. 10, in one embodiment, at least one of the motor 132 and reductive gearbox 134 can be positioned within the housing 102 or handle portion 110 of the portable tubing bender 100, such that at least one of the motor 132 and reductive gearbox 134 remain stationary relative to the housing 102, handle portion 110, and bender shoe 104. In one embodiment, the pivotable linkage connection 160 can take the shape of a plate (e.g., a circular shaped plate) (not depicted) configured to rotate about the central aperture 130, parallel to (e.g., alongside of) the bender shoe 104.

Figure 11:
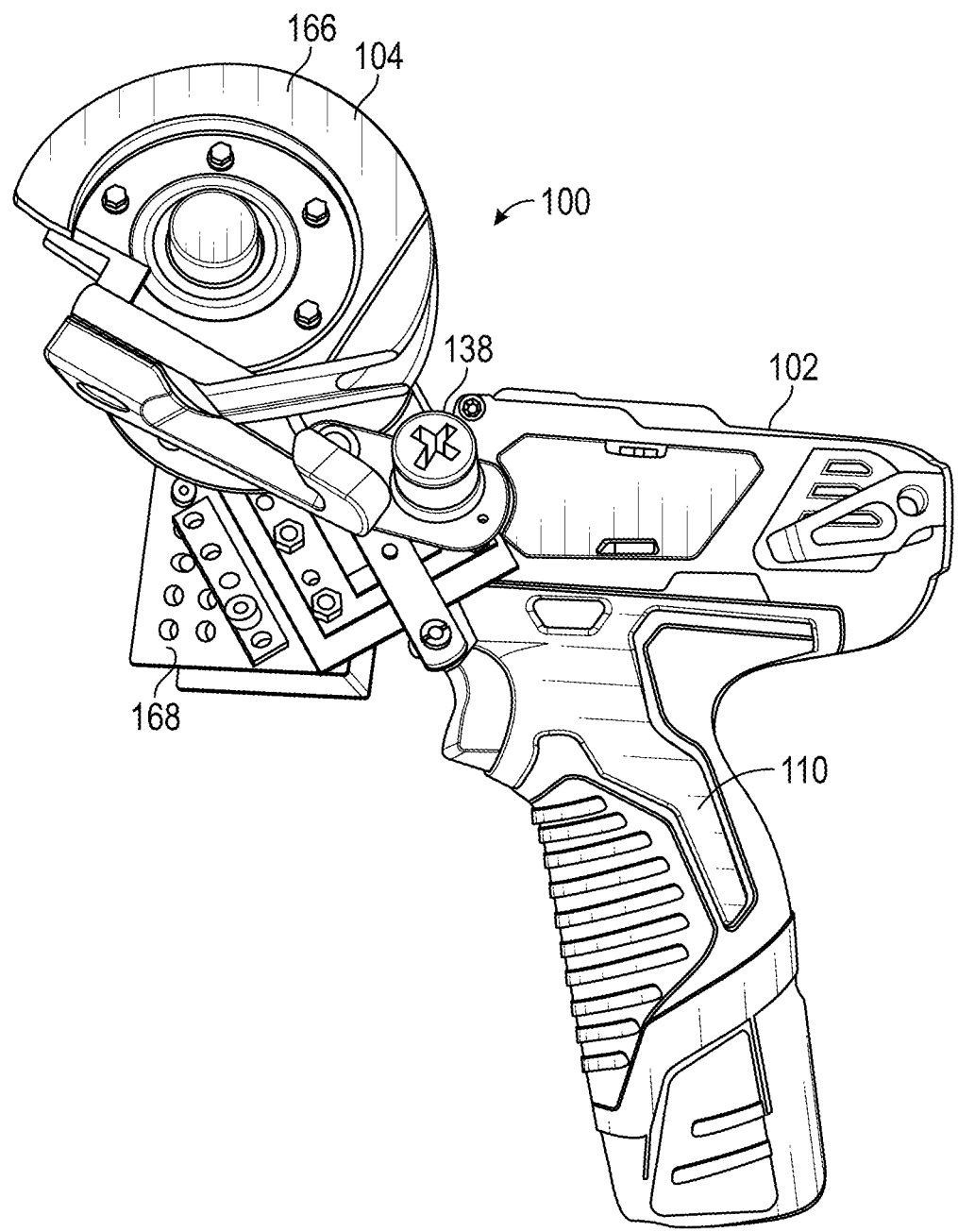
FIG. 11 is a left-side view depicting a portable tool in which one or more accessories can be operably coupled, in accordance with an embodiment of the disclosure.
Figure 12:
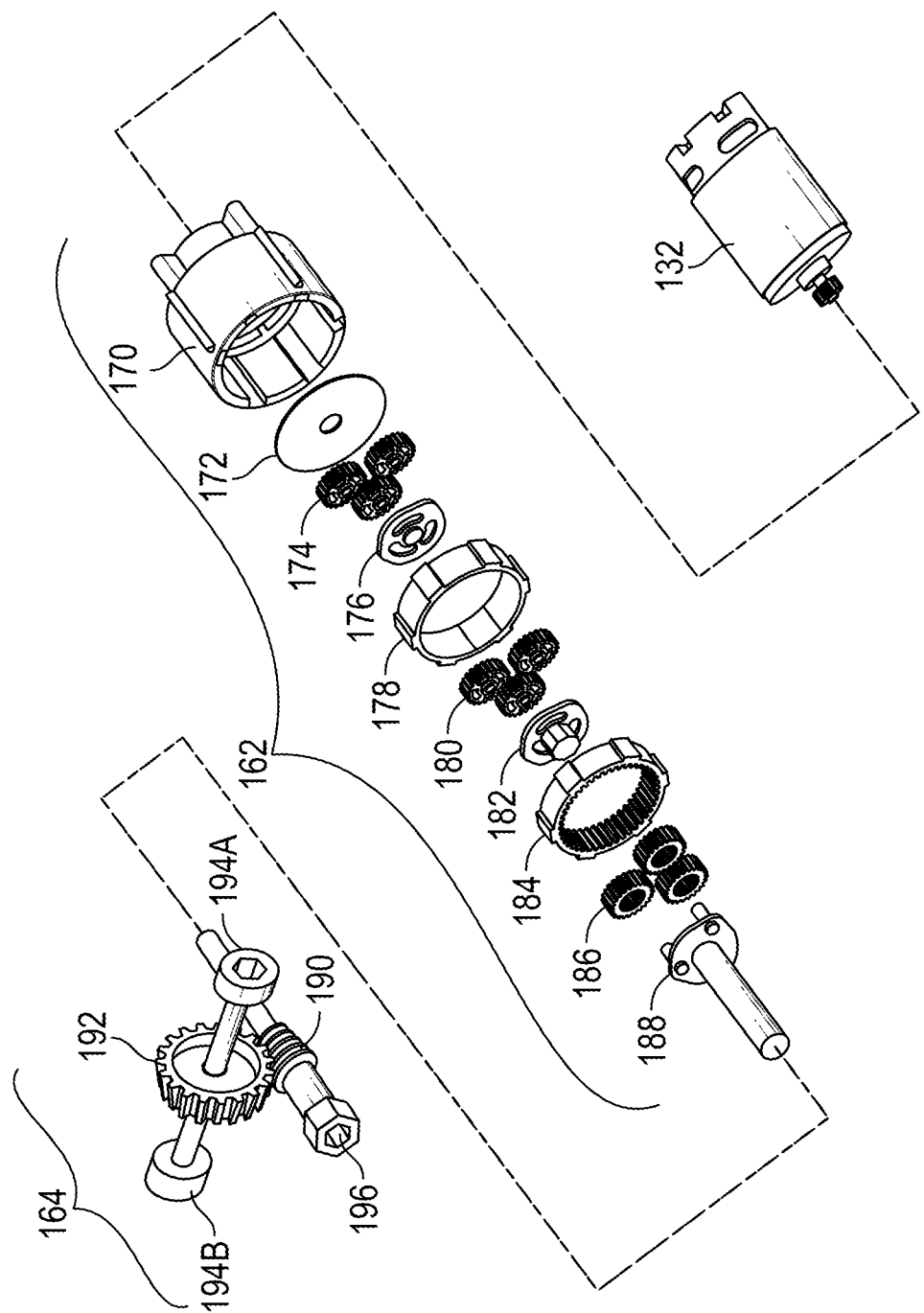
FIG. 12 is an exploded perspective view of a motor, transmission, and worm gear assembly, in accordance with an embodiment of the disclosure.
Figure 13A:
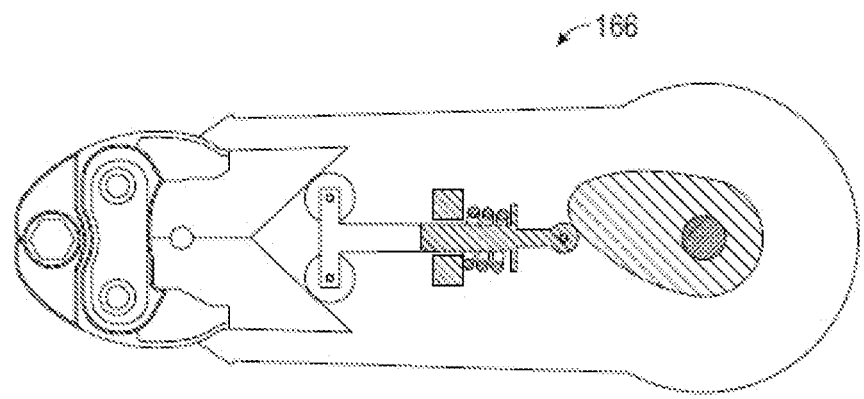
FIGS. 13A-D are schematic views depicting embodiments of attachments having two movable jaw sections operably coupleable to a portable tool, in accordance with an embodiment of the disclosure.
Figure 13B:
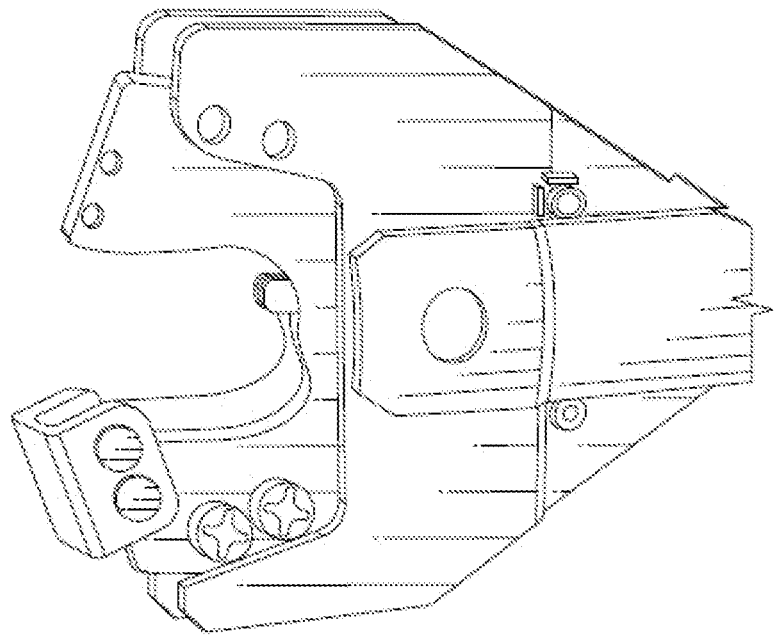
Figure 13C:
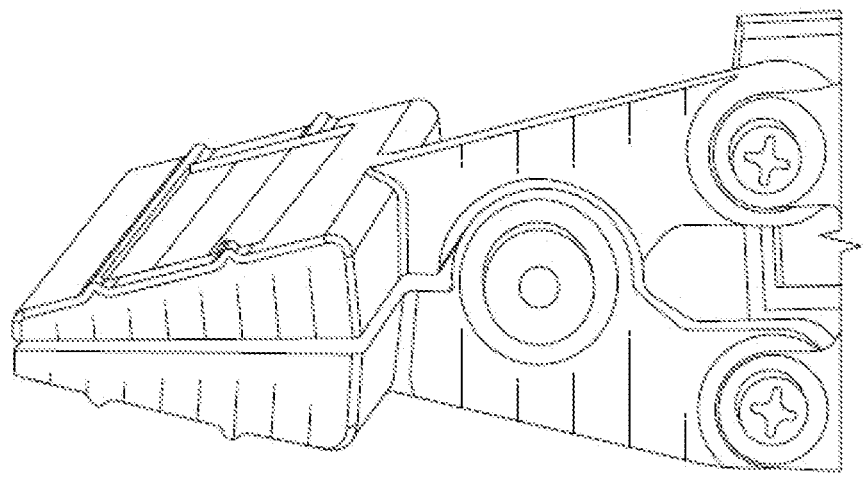
Figure 13D:
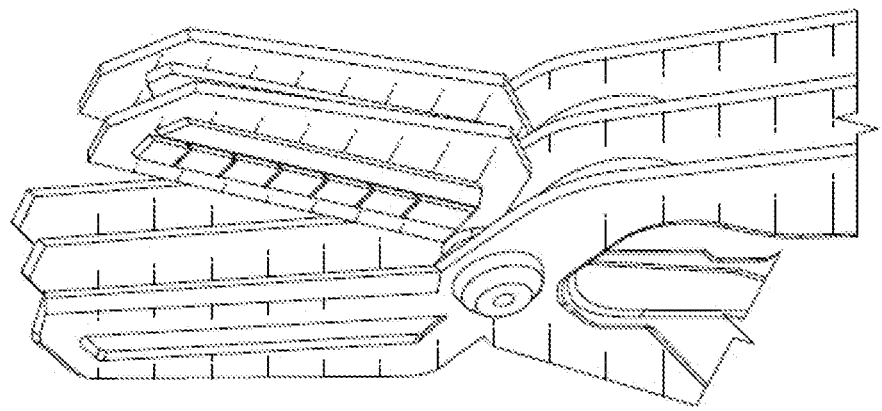
Figure 14A:
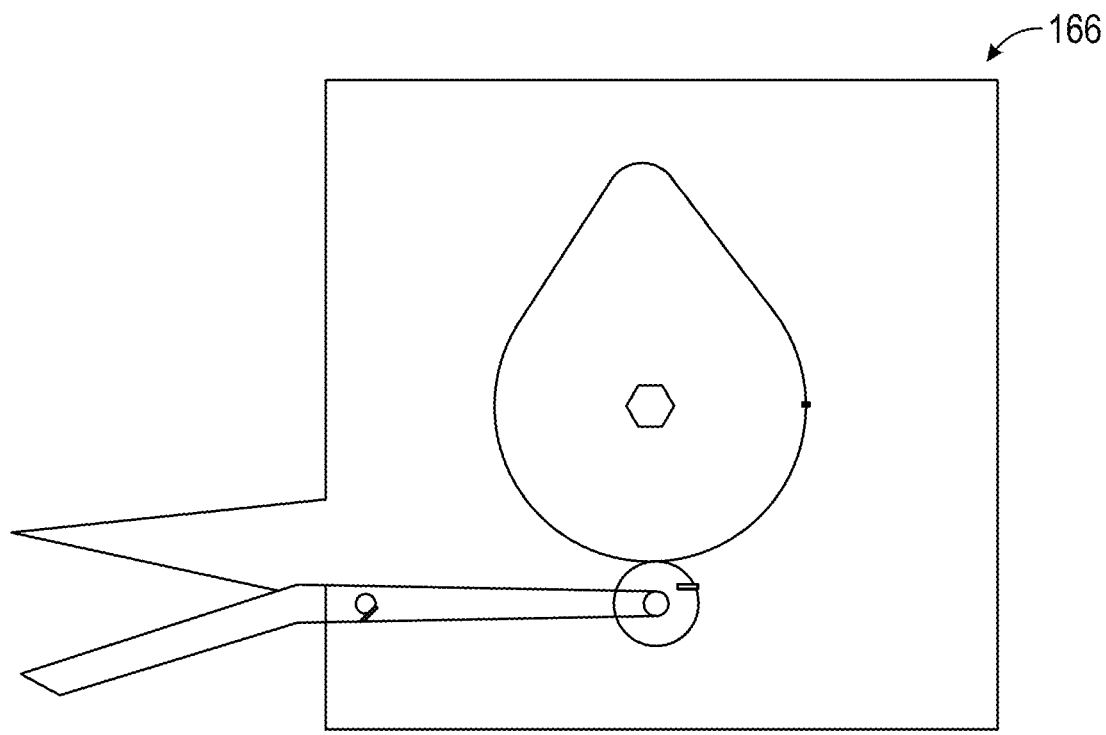
FIGS. 14A-B are schematic views depicting embodiments of attachments having one movable jaw section operably coupleable to a portable tool, in accordance with an embodiment of the disclosure.
Figure 14B:
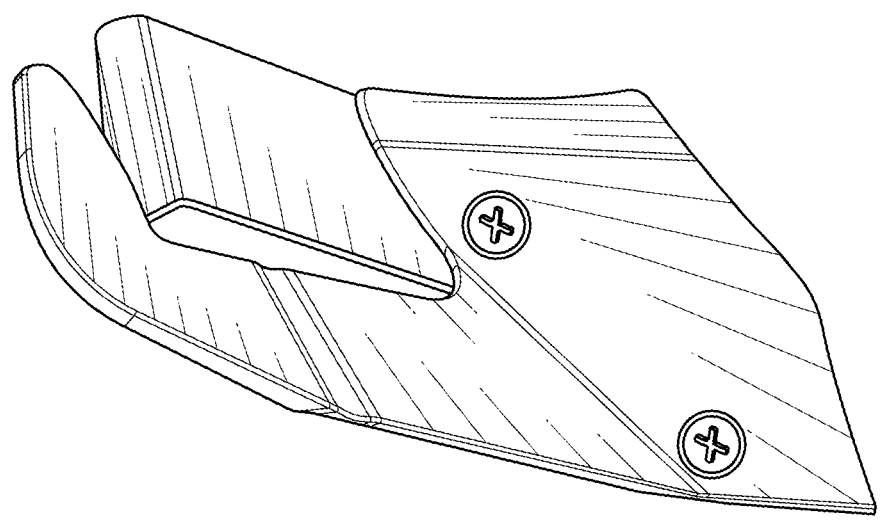

In yet another embodiment, the guide member 138 can be operably driven by a combination multistage planetary transmission 162 and worm gear assembly 164 (as depicted in FIG. 12). For example, with reference to FIG. 11, in one embodiment, an attachment 166 (e.g., including a bender shoe 104 and guide member 138) can be selectively coupled to the portable tool 100. In such embodiments, at least one of the motor 132, multistage planetary gearbox 162, and worm gear assembly 164 can be positioned within the housing 102 or handle portion 110 of the portable tool 100. In other embodiments, the worm gear assembly 164 can be at least partially enclosed in a frame 168 extending from a front portion of the housing 102. In such embodiments, the attachment 166 can be operably coupled to the housing 102 (or frame 168 extending from a front portion of the housing 102), so as to be driven by the worm gear assembly 164.

With additional reference to FIG. 12, The multistage planetary transmission 162 can include a gear case 170, motor plate 172, first set of planetary gears 174, first sun gear 176, a first and second stage ring gear 178, a second set of planetary gears 180, the second sun gear 182, a third stage ring gear 184, a third set of planetary gears 186, and an output carrier 188. The worm gear assembly 164 can include a worm shaft 190, which can be operably coupled to the output carrier 188 of the multistage planetary transmission 162, and a worm wheel 192. In one embodiment, the three stage planetary gear set can provide a gear reduction of 188:1, and the final worm gear reduction can provide an additional gear reduction of 24:1. Accordingly, in some embodiments, a 5000-5500 RPM output of the motor can be reduced to a final rotational output of less than about 1.5 RPM. Other transmission/gearbox 162 and worm gear 164 configurations are also contemplated. In some embodiments, one or more components of the transmission 162 and worm gear 164 can be incorporated into the attachment 166, thereby enabling a full coupling of the transmission 162 or worm gear 164 to the motor 132 of the portable tool 100 upon connection of the attachment 166 to the portable tool 100.

In some embodiments, the transmission 162 can be a shiftable multi-speed transmission configured to adjust a speed of output carrier 188 based on the use of the portable tool 100 (i.e., different sizes, diameters, or thickness of the tubing, etc., or at different stages of the process). In some embodiments, the a gearbox (e.g., transmission 162) can be provided that produces different gear ratios depending on a direction of rotation of the motor 132. For example, in one embodiment transmission 162 can be configured to provide a first gear ratio in response to rotation of the motor 132 in a first rotational direction, and a second gear ratio in response to rotation of the motor 132 in a second rotational direction opposite the first rotational direction, the second gear ratio being different than the first gear ratio. In one embodiment, the second gear ratio can be configured to rotate at a higher RPM than the first gear ratio (e.g., the first gear ratio can be greater than the second gear ratio to provide a greater speed reduction and higher torque during operation). In some embodiments, the lesser numeral reduction second gear ratio can enable a faster retraction of guide member 138, advantageously reducing the cycle time of the attachment 166. In some embodiments, the transmission 162 can include an actuatable speed selector (not depicted) to vary a gear ratio of the transmission 162.

In some embodiments, the transmission 162 and worm gear 164 can provide multiple output shafts configured to rotate at different speeds to accommodate different types of attachments 166. For example, in one embodiment, the worm gear 164 can include a pair of lateral outputs 194A/B and a front end output 196. In some embodiments, the outputs 194A/B, 196 can be in the form of a female socket (e.g., a hex socket) configured to receive a corresponding shaft of one or more attachments 166. In one embodiment, the front end output 196 can rotate at the same speed as the output carrier 188 of the transmission 162 (e.g., about 30 RPM), while the pair of lateral outputs 194A/B can rotate at a worm gear reduced rotational output (e.g., about 2 RPM), with a corresponding increase in output torque.

Torque outputs in the range of about 240-360 in-lbs (20-30 ft-lbs) are generally considered high in the cordless tool industry. By contrast, embodiments of the present disclosure can produce a torque output of about 1200 in-lbs (100 ft-lbs). Moreover, embodiments of the present disclosure can produce said torque with a battery having an overall tool weight of 1100 g or less. A specification sheet comparing an embodiment of the present disclosure with the Milwaukee M12 (model 2407-20) cordless drill is included below:

|  | Embodiment of the Present Disclosure | Milwaukee M-12 Drill |
|---|---|---|
| Overall Weight | 1273 g | 1134 g |
| Tool Weight Only | 1092 g | 953 g |
| Battery Weight Only | 181 g | 181 g |
| Motor Weight Only | 495 g |  |
| Battery Ah | 1.5 Ah | 1.5 Ah |
| Battery VDC | 12 VDC | 12 VDC |
| Battery Power | 18 Watts/hour Li-ion | 18 Watts/hour Li-ion |
| Motor | 12 VDC | Not mentioned |
| No Load RPM @ 12 VDC (Motor) | (0-30) RPM | (0-450) (0-1700) RPM |
| No Load Current @ 12 VDC (Motor) | 0.25 Amps @ 30 RPM | Not mentioned |
| Stall Torque @ 12 VDC | 3470 oz-in | Not mentioned |
| Stall Current @ 12 VDC | 9.2 Amps | Not mentioned |
| Planetary Gear Ratio | 188:1 | Not mentioned |
| Planetary Gear Casing | Steel ring gear | Not mentioned |
| Stage One | Steel pinion gear, Acetal orbital gears | Not applicable |
| Stage Two | Steel sun gear, Steel orbital gears | Not applicable |
| Stage Three | Steel sun gear, Steel orbital gears | Not applicable |
| Final Worm Gear Reduction | 24:1 | Not applicable |
| Calculated Torque Output | 5220 in · lbs/ 435 ft-lbs | 275 in · lbs/ 23 ft-lbs |
| Measured Torque Output* | 1130 in · lbs/ 94 ft-lbs | 204 in · lbs/ 17 ft-lbs |
| Final RPM Output | (0-1.25) RPM | (0-450) (0-1700) RPM |

*Output torque measured with an ACDelco digital torque adapter with cordless tool secured in a fixed position.

For further comparison, a specification sheet comparing an embodiment of the present disclosure with the Milwaukee M12 (model 2407-20) cordless drill, Milwaukee M18 (model 2803-20) cordless drill, Ridgid 18 V (model R86008) cordless drill, and Makita 18 V (model LXPH01) cordless drill is included below:

|  | Embodiment of the Present Disclosure | Milwaukee M-12 | Milwaukee M-18 | Ridgid 18 V | Makita 18 V |
|---|---|---|---|---|---|
| Overall Weight | 1273 g | 1134 g | 1909 g | 1999 g | 1845 g |
| Tool Weight Only | 1092 g | 953 g | 1179 g | 1277 g | 1201 g |
| Battery Weight Only | 181 g | 181 g | 730 g | 722 g | 644 g |
| Battery Ah | 1.5 Ah | 1.5 Ah | 5 Ah | 4 Ah | 3 Ah |
| Battery VDC | 12 VDC Li-ion | 12 VDC Li-ion | 18 VDC Li-ion | 18 VDC Li-ion | 18 VDC Li-ion |
| Battery Power | 18 W/hr Li-ion | 18 W/hr Li-ion | 90 W/hr Li-ion | 72 W/hr Li-ion | 54 W/hr Li-ion |
| Peak Torque Output Measured* | 94.1 ft-lbs | 17.1 ft-lbs | 31.6 ft-lbs | 24.6 ft-lbs | 25.4 ft-lbs |
| Calculated Stall Output Torque | 5205 in · lbs/ 433.75 ft-lbs | Claimed 275 in · lbs (22.9 ft-lbs) | Claimed 1,200 in · lbs (100 ft-lbs) | Claimed 535 in · lbs (44.58 ft-lbs) | Claimed 480 in · lbs (40 ft-lbs) |
| Final RPM Output | (0-1.25) RPM | (0-450) (0-1700) RPM | (0-550) (0-2000) RPM | (0-450) (0-1650) RPM | (0-400) (0-1500) RPM |

*Output torque measured with an ACDelco digital torque adapter with cordless tool secured in a fixed position.

In other embodiments, the output torque can be determined by a standardized test for determining relative torque measurements for corded and cordless drills, drills/drivers, and screwdrivers. See PTI Lab test procedures for determining relative torque measurements (RTM), https://www.powertoolinstitute.com/pti-includes/pdfs/TorqueLTP.pdf.

In embodiments, the final worm gear reduction can provide a degree of protection against an inadvertent rotation of the motor in the opposite direction when a torque load is applied to the output shaft while the motor is underpowered. In conventional cordless drills having planetary gear reduction assemblies, application of torque to the output shaft can cause a reverse rotation of the motor (e.g., rotation of the motor in a direction opposite to the direction that the motor normally rotates when power is applied). Thus, in order to inhibit reverse rotation, the motor must be continually powered when a torque load is applied. By contrast, embodiments of the present disclosure that include final worm gear reduction naturally inhibit reverse rotation of the motor, thereby enabling the output shaft to remain fixed in position when a torque load is applied to the output shaft, even when no power is applied to the motor. Accordingly, embodiments of the present disclosure enable the low RPM, high torque tool to hold an applied torque or force without consuming power.

While the transmission 162 and worm gear 164 described herein in the context of the a tubing bender, the transmission 162/worm gear 164 can be used in other tools where it is desirable to have different gear reductions depending on the rotational speed and torque needed for different applications. Various attachments 166 (alternatively referred to as "tool elements") can be readily coupled and decoupled to outputs 194A/B, 196. In some embodiments, the tool attachment 166 in the form of a conduit or tubing bender (such as that depicted in FIGS. 11 & 16B). Other tool attachments can include a heavy-duty riveter, metal working brake, sheathing/flashing brake, crimper, body shop panel gatherer, replacement for a vise, hydraulic press, millwright application (configured to move heavy objects in small increments), lift jack, spreader tool (similar to a jaws of life), replacement for air tools, welding clamp, vice grip, clippers, tree trimmer, wire cutter, crimping tool, rebar cutter, PVC tubing cutter, steel punch, threaded rod cutter, portable power take off shaft, fish tape, reciprocating saw, adhesive applicator, and powered ratchet tool; other tool elements are also contemplated.

Figure 15A:
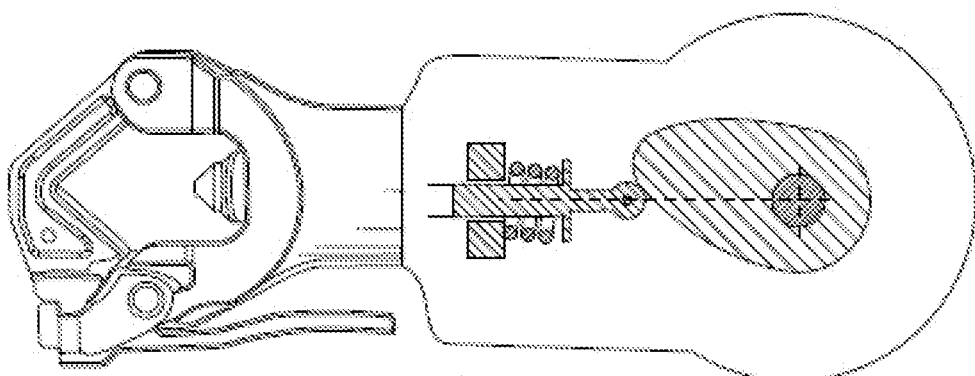
FIGS. 15A-D are schematic views depicting embodiments of attachments having an actuatable member operably coupleable to a portable tool, in accordance with an embodiment of the disclosure.
Figure 15B:
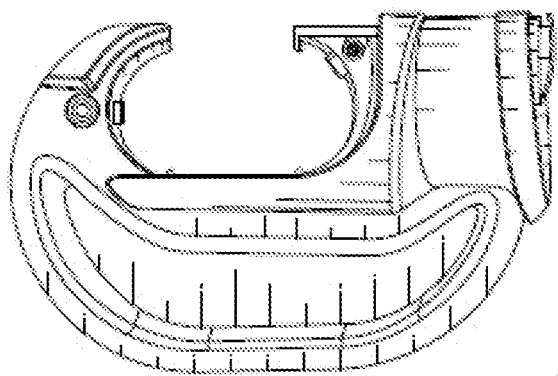
Figure 15C:
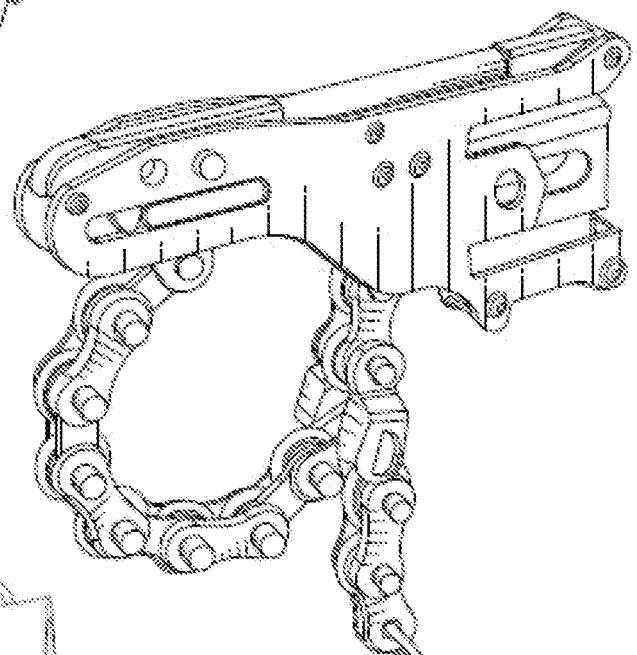
Figure 15D:
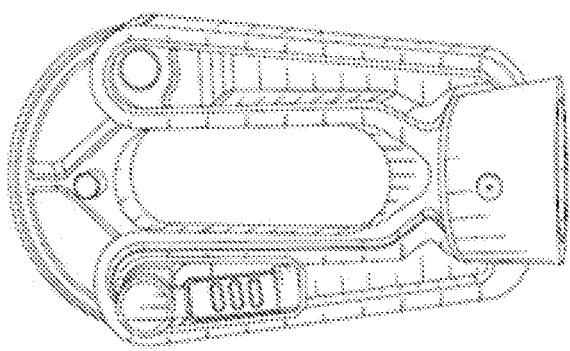

FIGS. 13A-15D depict various examples of different attachments 166, which in some embodiments can be operated by a cam and cam follower actuator assembly. For example, FIGS. 13A-E depict a cam and cam follower actuator assembly configured to pivot a pair of jaws of a crimping jaw (FIG. 13A), cable cutter (FIG. 13B), speed seamer (FIG. 13C), and five bladed crimper (FIG. 13D). FIGS. 14A-B depict a cam and cam follower actuator assembly configured to pivot one blade of a scissors (FIG. 14A) or shears (FIG. 14B). FIGS. 15A-C depict a cam and cam follower actuator assembly configured to actuate a driver in a die-less crimper (FIG. 15A), crimper (FIG. 15B), cast-iron pipe cutter (FIG. 15C), or crimper (FIG. 15D). The various different attachments 166 depicted herein represent mere examples of a wide variety of possible attachments 166 coupleable to the portable tool 100, and should not be considered limiting.

Figure 16B:
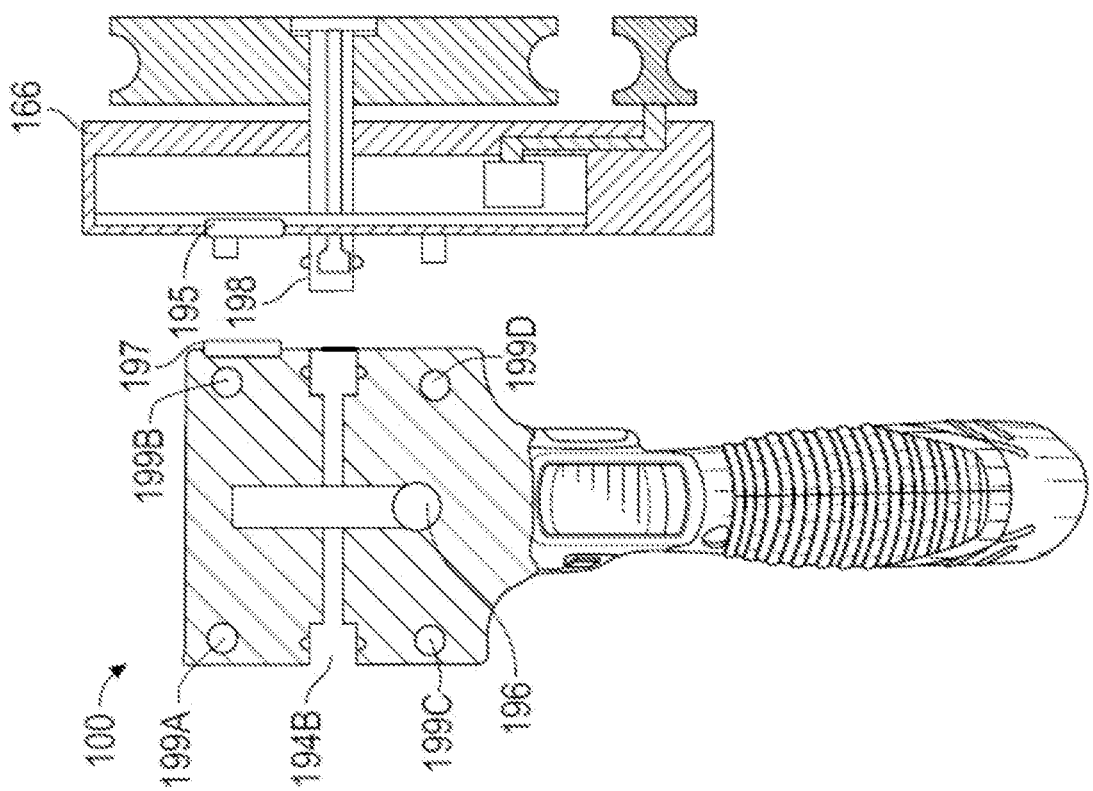
FIG. 16B is a front view depicting a portable tool and tubing bender attachment, in accordance with an embodiment of the disclosure.
Figure 16A:
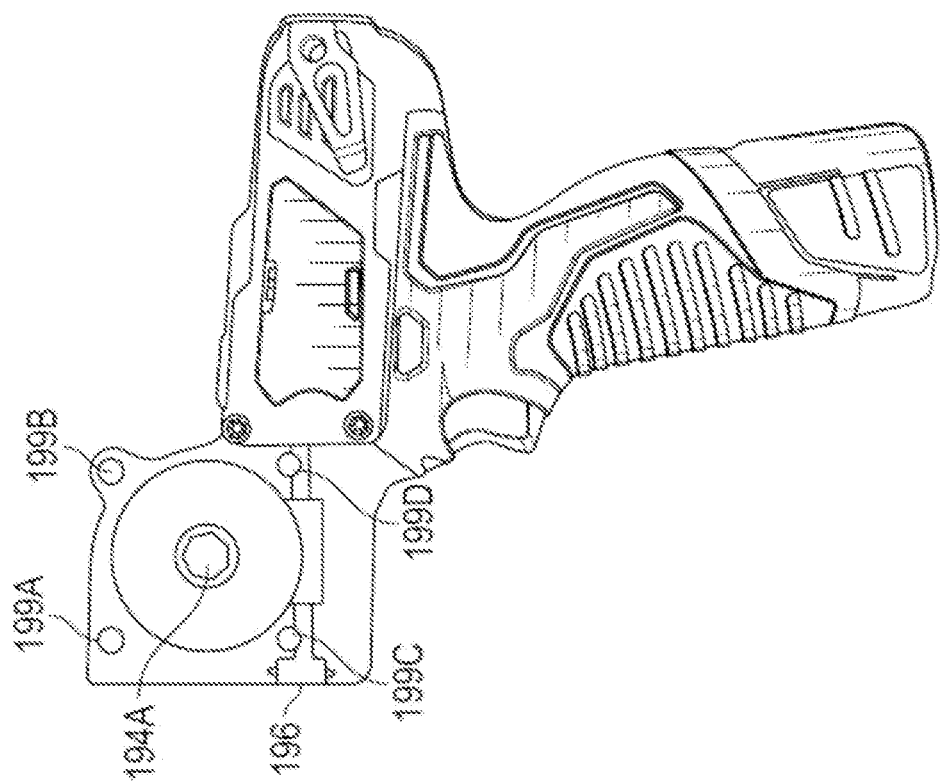
FIG. 16A is a left-side view depicting a portable tool, in accordance with an embodiment of the disclosure.

FIG. 16A-B illustrate a quick connection attachment 198 configured to releasably attach a working attachment 166 to the portable tool 100. In the illustrated embodiment, the quick connection attachment 198 includes one or more internal annular grooves configured to receive one or more projections extending from the quick connection attachment. Additionally, one or more stabilizers 199A-D can provide additional support for coupling of the attachment 166 to the portable tool 100. In some embodiments, the one or more stabilizers 199A-D can be configured in a pattern (e.g., a square pattern), thereby enabling coupling of the attachment 166 in different orientations with respect to the portable tool 100, depending upon the needs of the particular application. In some embodiments, the tool 100 can further include one or more power contacts, for example in the form of any of the one or more stabilizers 199A-D, configured to provide electrical power to the attachment 166.

In some embodiments, depending upon intended use, the various attachments 166 can include one or more limit switches to inhibit rotation of certain components of the tool element beyond defined limits. Additionally, in some embodiments, a rotational speed and torque output of the portable tool 100 can be automatically adjusted according to the attachment 166 operably coupled to portable tool 100. For example, in one embodiment, portable tool 100 can include a reader 197 configured to sense a magnetic code or other identifier 195 on the attachment 166, which can be used by the portable tool 100 to automatically adjust settings of the motor 132 for an output shaft rotational speed and output torque that complements or is best suited to the attachment 166 operably coupled to portable tool 100.

In embodiments, each attachment 166 can have its own unique identifier 195 configured to identify which specific attachment 166 is coupled to the portable tool 100. Accordingly, when an attachment 166 is coupled to the portable tool 100, the identifier 195 provides identifying information to the reader 197. The reader 197 can in turn communicate the identifying information to a controller, which can use the identifying information to determine which type of attachment 166 is coupled to portable tool 100. In some embodiments, the identifier 195 can include an active or passive RFID tag that stores the identifying information (e.g., a serial number, size, etc.), and the reader 197 can include an RFID reader that obtains the identifying information from the RFID tag. In some embodiments, the identifier 195 can electronically store the identifying information and communicate the identifying information to the reader 197 via a BLUETOOTH wireless transmission protocol, wireless networking, radio frequencies, or any other suitable wireless communication methods. In some embodiments, the reader 197 can further be configured to confirm that the attachment 166 is properly coupled to the portable tool 100.

With a positive identification of the attachment 166, the controller can adjust one or more operating parameters of the portable tool 100 (e.g., movement distance, speed, number of rotations, etc.) in order to improve operational performance. In some embodiments, the controller can modify the functionality of the trigger 112 according to the particular attachment 166 coupled to the portable tool 100. For example, where the attachment 166 is in the form of a clamp, jaws or scissors, the trigger 112 can act as an extension of a finger of the user, such that full actuation of the trigger 112 corresponds to one full actuation of the attachment 166 (e.g., pulling the trigger halfway causes the clamp, jaws or scissors to close halfway, and subsequent release of the trigger causes the clamp, jaws or scissors to open).

In another embodiment, for example where the attachment 166 is a fish tape tool, the controller can advantageously provide a faster speed when the tape is being fed off the spool, and a slower speed when the tape is being retracted and pulling wires. Further, in some embodiments, the attachment 166 portable tool 100 can be controlled remotely, for example via a mobile computing device, thereby enabling a user to actively guide the fish tape as it is routed through an electrically powered junction box. Further, each of the various attachments can include its own programming application accessible via a mobile computing device.

Figure 17:
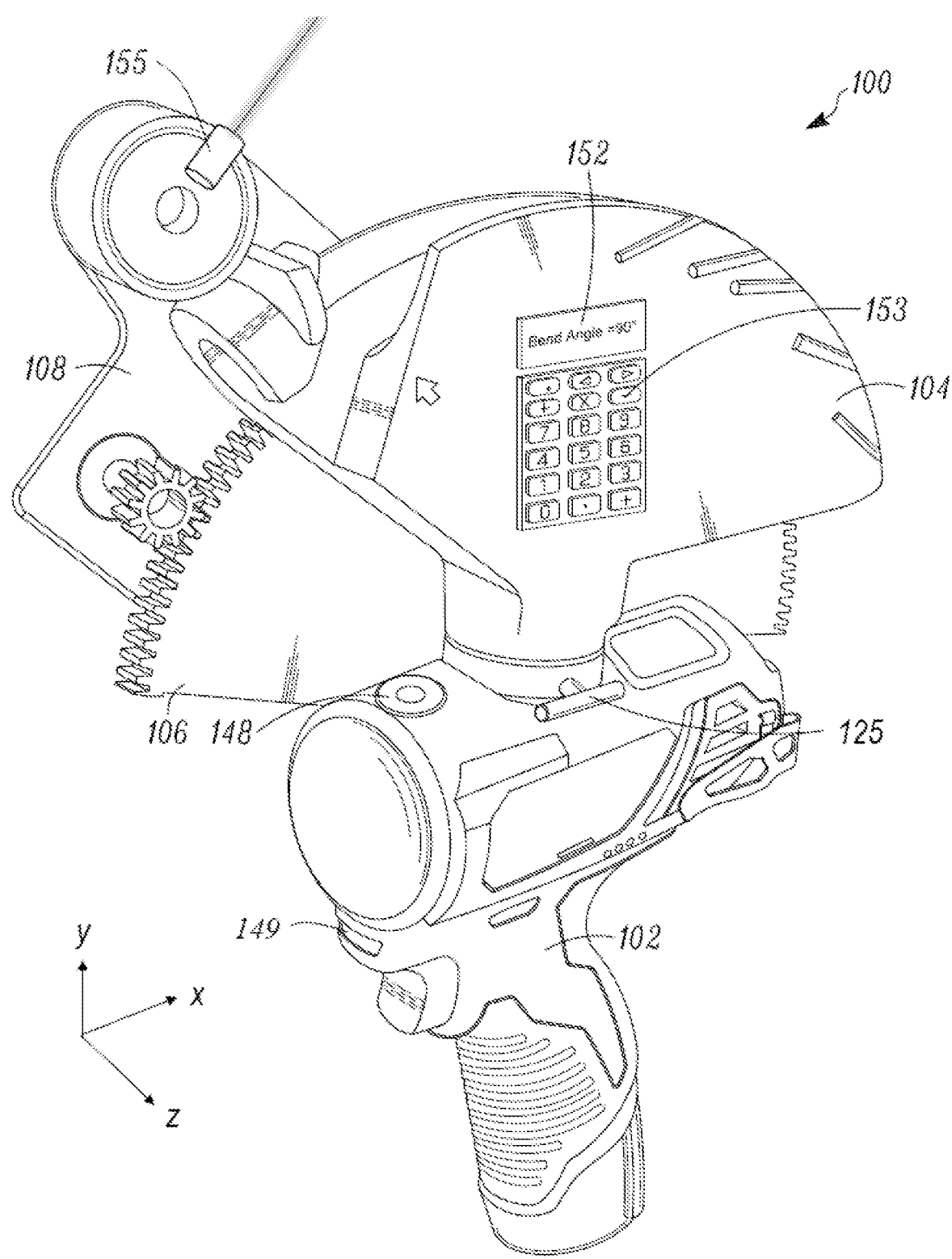
FIG. 17 is a perspective view depicting a portable tubing bender, in accordance with the disclosure.

With additional reference to FIG. 17, in some embodiments, the portable tool 100 can include a leveling device 148, configured to serve as an aid in leveling the portable tool 100 relative to a gravitational frame of reference along at least one of an x-axis and y-axis. For example, in one embodiment, the leveling device 148 can be a bubble level, such as a bull's-eye bubble level, or some other type of leveling tool, such as a magnetic or electronic level. In some embodiments, the leveling device 148 can be included within a display 152/keypad 153, which in some embodiments can be incorporated into a component of the portable tubing bender 100. In one embodiment, the portable tool 100 can include a work light 149 configured to partially illuminate the work space. Depending upon the application desired the various attachments 166 (as depicted in FIGS. 11, 13A-15C, and 16B) can include a display and/or a keypad.

Figure 18:
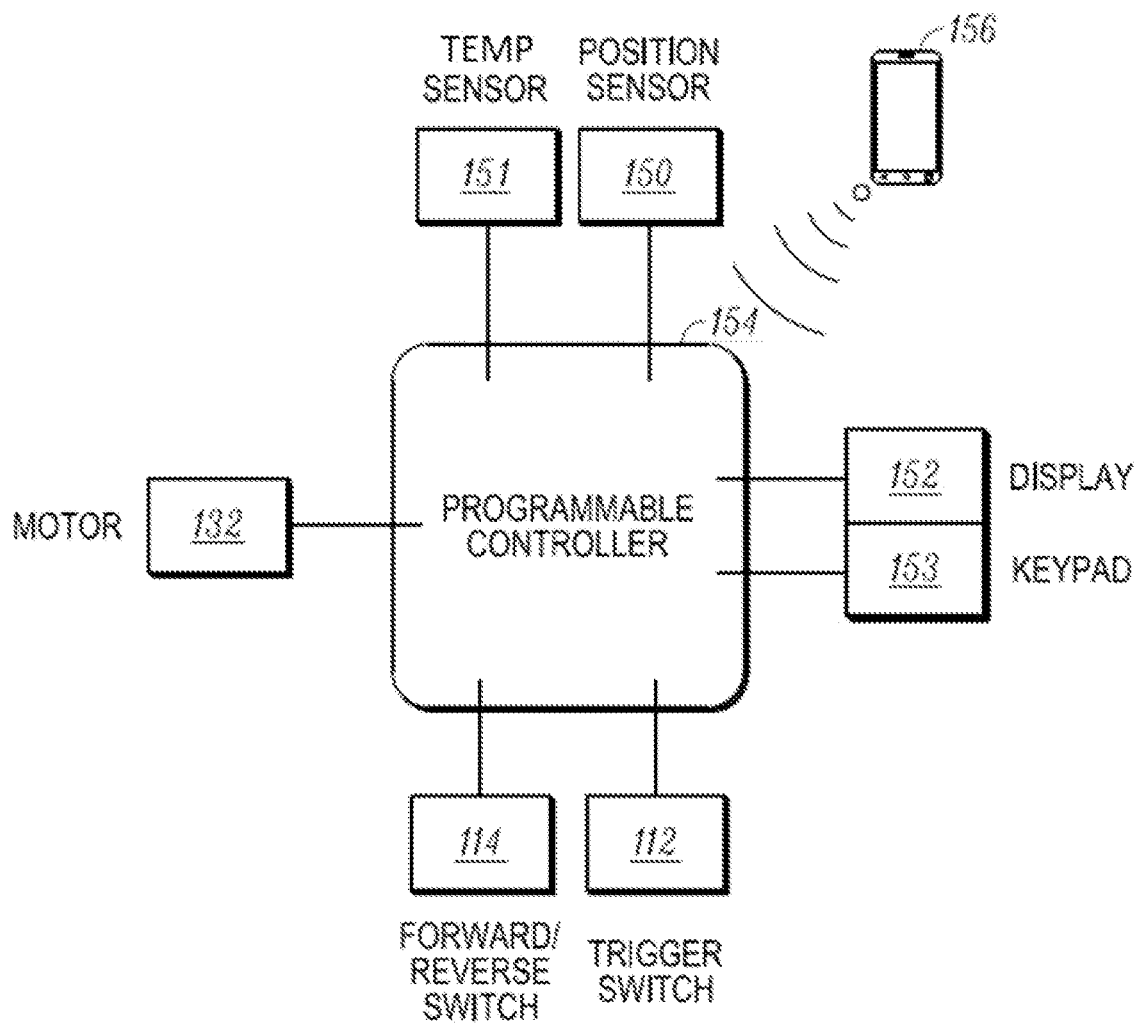
FIG. 18 is a schematic view depicting various components of embodiments of the portable tubing bender, in accordance with the disclosure.

In one embodiment, the portable tool 100 can have angular position sensing capabilities of the rotating components relative to the stationary components. In these embodiments, the portable tool 100 can include an angular position sensor 150 (as depicted in FIG. 18) configured to sense rotation of at least one of the guide frame 108 or guide member 138 relative to the guide gear 106 or bender shoe 104. For example, in one embodiment, the angular position sensor 150 can be operably coupled to the motor 132 or driven gear 136 to provide information regarding the angular position of the rotating components relative to the stationary components. In embodiments, the angular position sensor 150 can be a Hall effect sensor responsive to a magnetic element. In other embodiments, the angular position sensor 150 include an optical sensor, switch, or any other position sensor capable of determining when the rotating components reach a particular position.

In some embodiments, the angular position sensor 150 is configured to count a number of rotations or position of the output or cam during operation of the portable tool 100. In some embodiments, the angular position sensor 150 can detect or measure values such as a number of cycles, revolutions of the output shaft, position of the attachment 166, or the like. In some embodiments, the portable tool 100 can use feedback from the angular position sensor 150 to determine and control stroke length of a cam and follower actuator assembly, or the like. Accordingly, using the measured values, the portable tool 100 can be configured to bend conduit or tubing to a predetermined angle. Further, in some embodiments, the angular position sensor 150 can be configured to detect when the attachment 166 reaches an extended position or returns to a home position.

In some embodiments, the portable tool 100 can be configured to display an angular position of rotating components (e.g., the guide frame 108/guide member 138) relative to stationary components (e.g., the guide gear 106/bender shoe 104) via the display 152. In some embodiments, the motor 132 can be smart (e.g., programmable), such that a user can input a desired bend angle into the keypad 153 or other user interface (e.g., a smart phone or other mobile computing device) coupled to a programmable controller 154 (as depicted in FIG. 18), prior to actuating the motor 132 (e.g., via the trigger 112 or other interface). For example, in one embodiment, a user can use a mobile computing device 156, such as a cellular phone, tablet, or portable computer, in a wired or wireless connection with the programmable controller 154 to transmit information to and receive information from the programmable controller 154. Accordingly, in some embodiments a user can utilize the mobile computing device 156 for remote control of the portable tool 100 (and attachment 166) as desired.

In some embodiments, the portable tool 100 can include a temperature sensor 151 configured to enable improved performance of the portable tool by controlling a driven output based on ambient temperature conditions of the workspace or working material. In one embodiment, the temperature sensor 151 is configured to sense a temperature of the ambient environment surrounding the portable tool 100 and can include a thermocouple, thermistor, RTD, or the like. The temperature sensor 151 can be in communication with the controller 154, such that the controller 154 can continuously or periodically monitor the temperature sensor 151 to determine whether the ambient temperature is below a predetermined threshold temperature (e.g., 40 degrees Fahrenheit). If so, the controller can automatically initiate, for example, a cold operating mode.

In a cold operating mode, the controller 154 can increase or decrease the torque or rotational angles imparted on the attachment 166 through adjustment of the motor 132. For example, where the attachment 166 is in the form of an expansion tool configured to impart a shape on a plastic or polyvinyl object, in the cold operating mode, the controller 154 can reduce the expansion of the jaws 118 by some desired distance. In some embodiments, the controller 154 can similarly initiate a warm temperature operating mode if the ambient temperature is above a second predetermined threshold temperature (e.g., 80 degrees Fahrenheit). In the warm operating mode, the controller 154 can increase the amount of expansion by some desired distance.

In some embodiments, the display 152 can indicate the ambient temperature measured by the temperature sensor 151. In some embodiments, the user may set the portable tool 100 to operate in the normal operating mode, the cold operating mode, or the warm operating mode via an external interface (e.g., a smart phone, computer, or the like) that communicates with the portable tool 100 remotely (e.g., via BLUETOOTH, near field communication, or the like). In some embodiments, the first and second threshold temperatures can be preprogrammed. In other embodiments, the first and second threshold temperatures can be set and adjusted by a user.

In some embodiments, the controller 154 can detect a last cycle of operation intended by the user. For example, in one embodiment, the user can indicate to the controller 154 (i.e., by pushing a button, letting go of the trigger, etc.) that the portable tool 100 has reached the last cycle. Similarly, the controller 154 can be configured set a last cycle time (e.g., a period of time longer than the cycle time), which holds the attachment 166 in the expanded position for a predetermined period of time.

In one embodiment, a user can use the mobile computing device 156 as an aid in determining one or more dimensions of a space in which conduit is to be installed. For example, in one embodiment, the mobile computing device 156 can be positioned against surfaces within the space, thereby enabling the mobile computing device 156 to record respective positions of each surface in order to develop a three-dimensional model of the space in which the conduit is to be installed. In another embodiment, the mobile computing device 156 can have scanning capabilities configured to detect fixed surfaces within the space to develop a three-dimensional model. For example, in one embodiment, the mobile computing device can use a laser, camera or other optical sensor to detect fixed surfaces within the space. Thereafter, a user of the mobile computing device 156 can determine a desired layout of conduit within the space as well as a corresponding set of conduit bend specifications. The set of conduit bend specifications can include the number and angle of each of the bends required in the various sections or portions of conduit necessary to complete the desired layout. In one embodiment, the mobile computing device 156 or display 152/keypad 153 can include a smart bend calculator configured to determine a multiplier to determine bend spacing, bend angles, and bends in multiple planes (e.g., where one bend is rotated along a longitudinal axis of the conduit with respect to a prior or subsequent bend).

Figure 20:
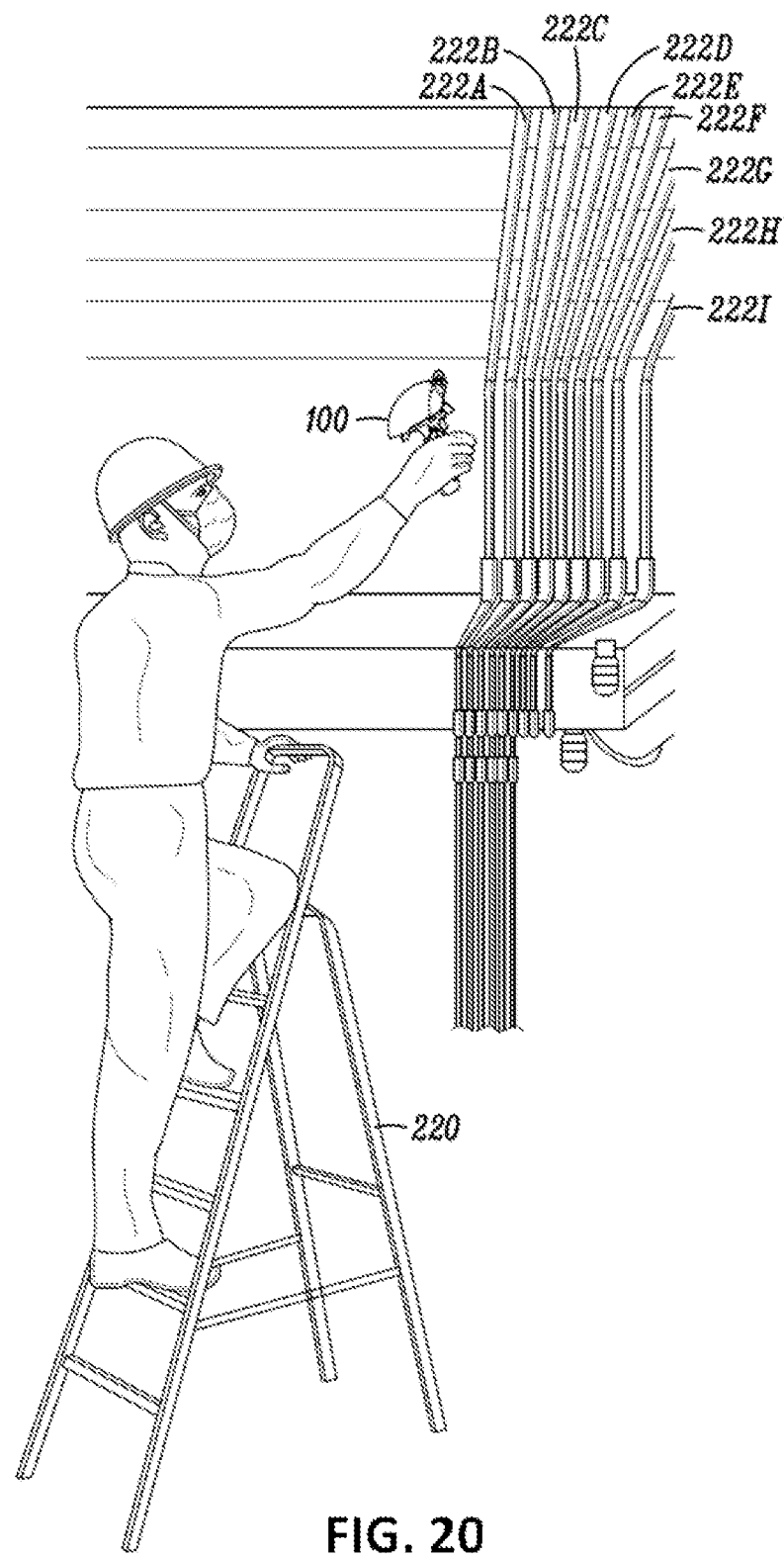
FIG. 20 is a perspective view of a user operating a portable tubing bender of the present disclosure with a single hand, while standing on a ladder maintaining three points of contact, in accordance with an embodiment of the disclosure.

In some embodiments, the portable tool 100 can include a laser 155 or other optical sighting mechanism configured to provide a visual aid in bending conduit or tubing. For example, in one embodiment, a laser 155 can be operably coupled to the guide frame 108 (as depicted in FIG. 17), bearing wheel 140, guide gear 106, bender shoe 104, or the like. In some embodiments, the laser 155 can be configured to move relative to the hand of the user as the portable tool 100 bends conduit, thereby providing an external visual indication of the degree of bend imposed on the conduit. In some embodiments, the laser 155 can be used to align a portion of conduit to be bent (e.g., in place as depicted in FIGS. 20-21B) relative to the installation environment (e.g., with another stick of conduit, a hole in a wall, junction box, etc.), thereby providing an important visual cue in determining the amount of bend to be performed.

One advantage provided by embodiments of the present disclosure includes a significant reduction in the size of the portable tubing bender 100, particularly in comparison to conventional bending systems of the prior art. In part, a reduction in size of the portable tubing bender 100 is made possible by the inclusion of a motor 132, driven gear 136 and guide member 138 on a pivotable guide frame 108 positioned parallel to, or alongside, of the bender shoe 104, rather than being mounted to a frame or housing to which the bender shoe 104 is pivotably coupled, which is generally the case with conventional tubing benders. This advantage is made clear by a side-by-side comparison of an example conventional tubing bender 200 (specifically the tubing bender disclosed in U.S. Pat. No. 7,900,495) (as depicted in FIG. 19A), with a portable tubing bender 100 of the present disclosure (as depicted in FIG. 19B).

Figure 19B:
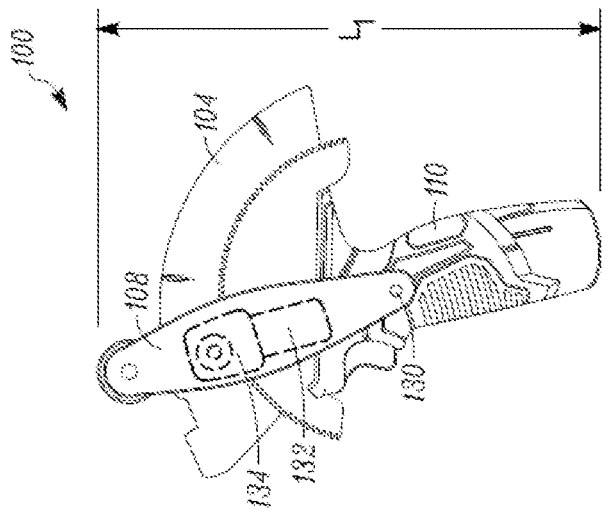
FIG. 19B is profile view depicting a portable tubing bender, in accordance with an embodiment of the disclosure, for a side-by-side size comparison with the portable tubing bender of the prior art of FIG. 19A.
Figure 19A:
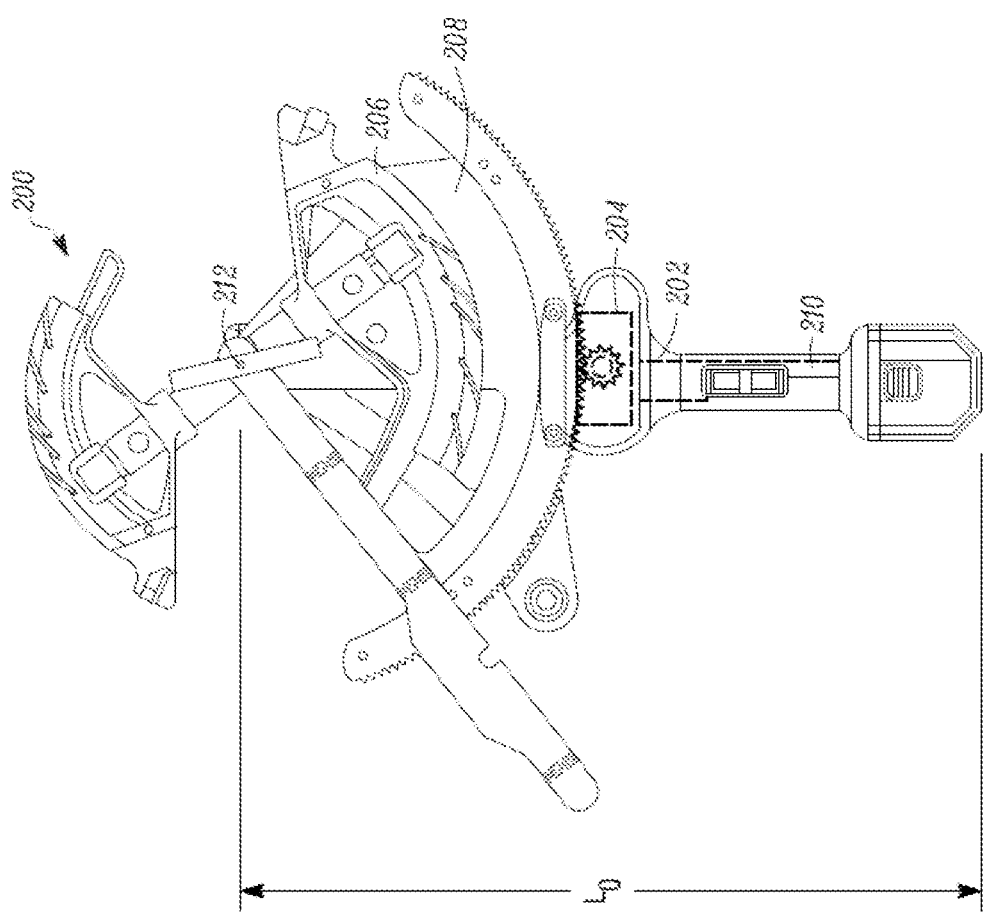
FIG. 19A is a profile view depicting a portable tubing bender of the prior art.

With reference to FIG. 19A, the depicted conventional tubing bender 200 relies on a stationary motor 202 and reductive gearbox 204 to rotate a bender shoe 206 relative to a heavy fixed frame 208. Accordingly, the motor 202 and gearbox 204 (which are incorporated into a handle portion 210) remain fixed in position relative to the frame 208. The bender shoe 206, which is pivotably coupled to the frame 208 at pivot 212, rotates relative to the frame 208. It is noted that while the conventional tubing bender 200 depicted in FIG. 19A includes two opposing bender shoes (e.g., a ¾-inch bender shoe, with an opposing ½-inch bender shoe), a single bender shoe (e.g., ¾-inch bender shoe 206) may alternatively be employed.

By contrast, with reference to FIG. 19B, embodiments of the present disclosure eliminate the need for a separate fixed frame, by using the bender shoe 104 itself as the equivalent of a fixed frame operably coupled to the handle portion 110, and rotating the motor 132 and reductive gearbox 134 relative to and alongside the bender shoe 104. Accordingly, as can be seen in FIGS. 19A-B, elimination of the fixed frame and the positioning of the motor 132 and reductive gearbox 134 to pivot generally parallel to and alongside of the bender shoe 104, enables the construction of a more compact, lighter weight device 100.

Specifically, by keeping the bender shoe 104 stationary, embodiments of the present disclosure can be constructed with an overall shorter length (L1), in comparison to an equivalent minimum length (L0) of the tubing bender 200 of the prior art. The overall reduction in length L1 is made possible by positioning a central pivot point or axle 130 of the bender shoe 104 on the handle portion 110 (wherein in the prior art bender shown in FIG. 19A, the central aperture 212 is positioned above the handle portion 210), and by positioning the motor 132 and reductive gearbox 134 in a pivotable guide frame 108 alongside of the bender shoe 104 (wherein in the prior art bender shown in FIG. 19A, the motor 202 and reductive gearbox 204 are positioned in the handle portion 210 below the bender shoe 206).

Further, elimination of the fixed frame 208 in embodiments of the present disclosure (such as is required in the FIG. 19A bender), results in a significant weight savings. The resulting device 100 is a lightweight, compact and well-balanced portable tubing bender. In some embodiments, the portable tubing bender 100 can have an overall weight of less than 2 lbs; although other weights of the portable tubing bender 100 (e.g., less than 3 lbs, less than 4 lbs, less than 6 lbs, less than 8 lbs, less than 10 lbs, less than 12 lbs, less than 14 lbs, less than 16 lbs., less than 18 lbs, less than 20 lbs, etc.) are also contemplated. In some embodiments, the portable tubing bender 100 can include a belt clip 158 (depicted in FIG. 1) configured to enable the portable tubing bender 100 to be worn on the belt of a user. In other embodiments, the portable tubing bender 100 can be configured to be worn in a holster or other carrier. In both cases, the weight of the portable tubing bender 100 can be light enough to be comfortably worn by a user.

With reference to FIG. 20, portable tubing benders 100 of the present disclosure can be constructed such that it is possible to operate the device 100 with a single hand. Accordingly, embodiments of the present disclosure enable the bending of conduit while working on a ladder 220, while also maintaining the OSHA three points of contact requirement (e.g., users can maintain two feet and a hand on the ladder at all times). For example, as depicted in FIG. 20, a user can bend and align multiple parallel sections of conduit 222A-I, in place (e.g., with the conduit positioned on a wall or ceiling), with a single hand.

Figure 21A:
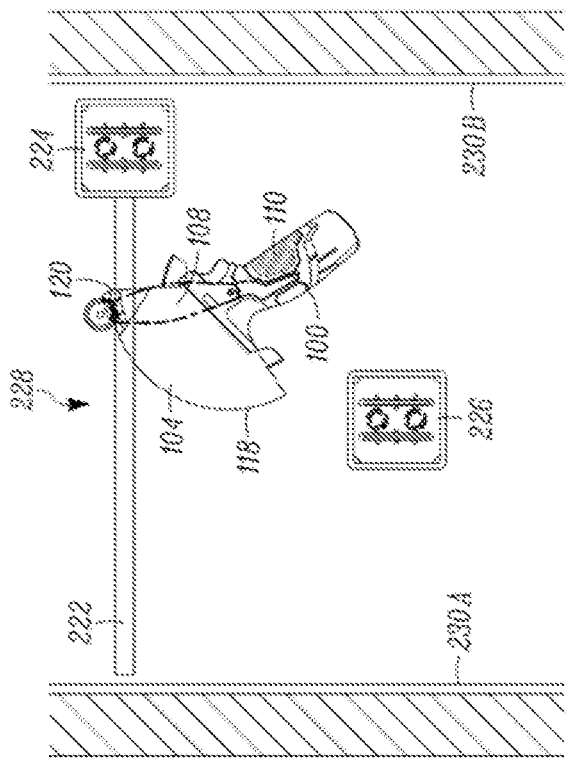
FIG. 21A is a profile view of a portable tubing bender of the present disclosure positioned on a length of tubing within an installation environment.
Figure 21B:
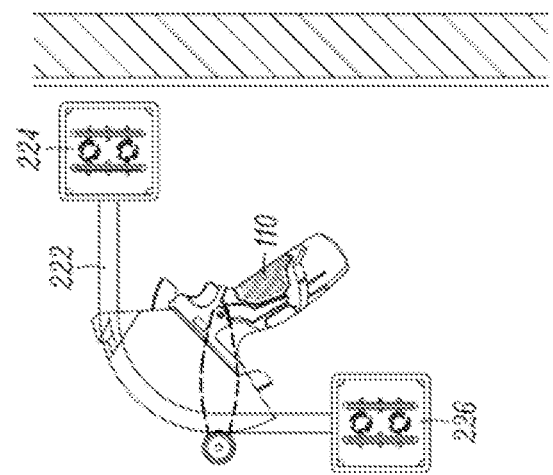
FIG. 21B is a profile view of the portable tubing bender of FIG. 21A within the installation environment after commencing a bending operation.

With reference to FIG. 21A, in operation, it may be desirable to bend a section of conduit 222 from a first junction box 224 (to which the conduit 222 is affixed), to a second junction box 226. Further, as is often the case, the available workspace 228 may be constrained within fixed structures 230A-B. Accordingly, as depicted in FIG. 21A, the conduit 222 can be positioned within the arcuate channel 118 of the bender shoe 104 and proximate to the hook 120. Thereafter, the guide frame 108 can be actuated to bend the conduit 222 according to the arc defined by the arcuate channel 118. As depicted in FIG. 21B, the result is the positioning of an approximately 90° bend in the conduit 222, thereby enabling the conduit 222 to be connected to the second junction box 226. Further, as can be seen in FIGS. 21A-B, the conduit 222 can be bent in place while keeping the handle portion 110 of the device 100 stationary with respect to the workspace 228 (e.g., a user does not need to guide the device along the conduit 222 or rotate the device with respect to the conduit 222 during bending operations). The same cannot be said for tubing benders like that shown in FIG. 19A.

Figure 22A:
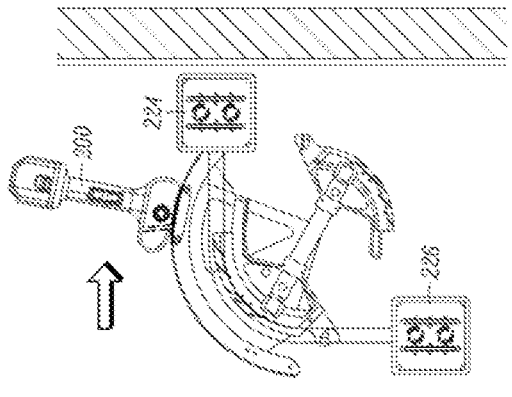
FIG. 22A is a profile view of a portable tubing bender of the prior art positioned on a length of tubing within an installation environment.
Figure 22B:
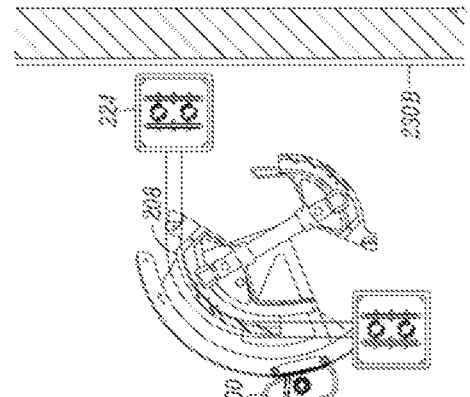
FIG. 22B is a profile view of the portable tubing bender of FIG. 22A within the installation environment after commencing a bending operation.

For example, with reference to FIGS. 22A-B, bending the same section of conduit 222 from the first junction box 224 to the second junction box 226 between structural constraints 230A and 230B with a tubing bender 200 of the prior art requires a user to shift the device 200 along a longitudinal axis of the conduit 222 during the bending operation. Accordingly, unlike embodiments of the present disclosure, it is necessary to move the tubing bender 200 within the workspace 228 when bending conduit 222. Moving the tubing bender 200 during bending operations can present an additional challenge, particularly when working in a confined area. For example, as depicted in FIG. 22B, shifting the device 200 along the longitudinal axis of the conduit 222 causes the device 200 to contact the first junction box 224, thereby discouraging the tubing bender 200 from successfully completing the required bending operation, while the conduit 222 is in position.

Figure 23A:
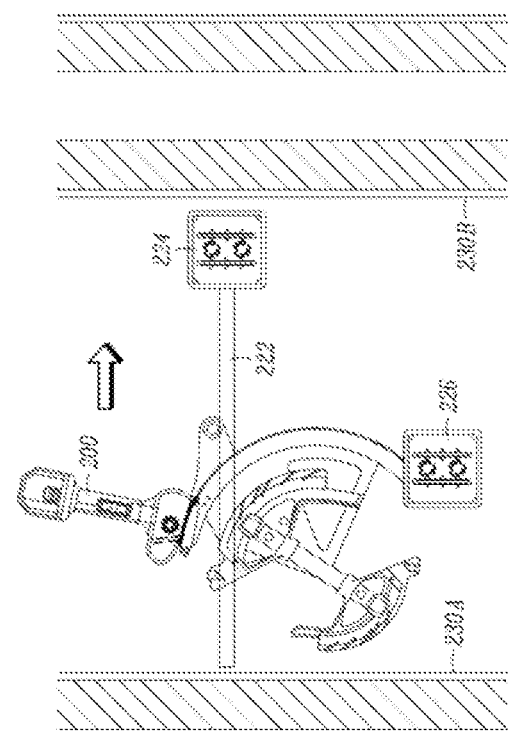
FIG. 23A is a profile view of a portable tubing bender of the prior art positioned on a length of tubing within an installation environment.
Figure 23B:
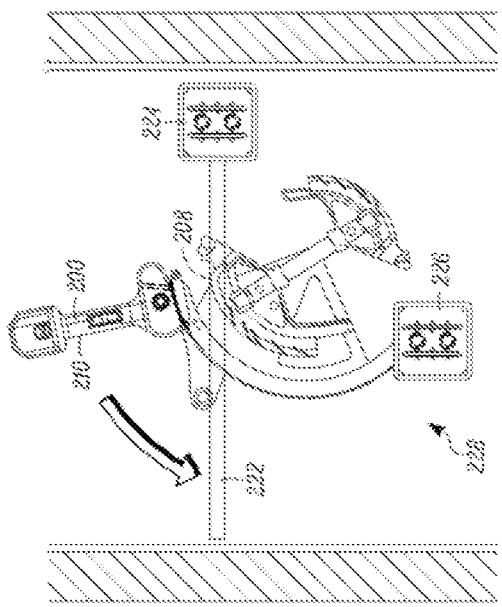
FIG. 23B is a profile view of the portable tubing bender of FIG. 23A within the installation environment after commencing a bending operation.

With reference to FIGS. 23A-B, if a user were to attempt to keep the bender shoe 208 fixed in position relative to the workspace 228, the handle portion 210 would need to be pivoted about the bend in the conduit 222 as the bend occurs. Accordingly, even if this were possible to complete with a single hand, as depicted in FIG. 23B, pivoting the handle portion 210 causes the handle portion 210 to contact the structural constraint 230A, thereby discouraging the tubing bender 200 from successfully completing the required bending operation.

Accordingly, in addition to presenting a more compact, lighter weight, and better-balanced tubing bender 100, embodiments of the present disclosure enable the bending of a fixed section of conduit without the need to translate or rotate the handle portion 110 of the device 100 relative to the conduit 222. That is, once the device 100 is positioned relative to the conduit 222, and bending operations commence, the device 100 remains fixed in position relative to the conduit 222, which is an important aspect when working in a confined area or where a user's reach may be limited (e.g., on a ladder).

The invention is further illustrated by the following embodiments:

A portable tubing bender, comprising: a portable housing including a handle portion;
 a bender shoe operably coupled to the portable housing, the bender shoe defining an arcuate channel configured to restrain a length of tubing along a prescribed arc during bending operations; a guide gear fixedly coupled to the bender shoe; and a guide frame pivotably coupled to the bender shoe, the guide frame including a motor, a driven gear and a guide member, the motor configured to drive the driven gear along the guide gear to pivot the guide frame relative to the bender shoe, so as to move the guide member during bending operations to guide the length of tubing along the arcuate channel of the bender shoe.

A system or method according to any preceding embodiment, wherein the arcuate channel of the bender shoe is configured to receive at least one of Electrical Metallic Tubing (EMT), Rigid Metal Conduit (RMC), Intermediate Metal Conduit (IMC), PVC coated rigid metal conduit, copper tubing, aluminum tubing, stainless steel tubing, tubing used for HVAC or refrigeration systems, tubing used in elevator systems, or other types of tubing or conduit.

A system or method according to any embodiment, wherein the arcuate channel of the bender shoe is configured to receive EMT of a ½-inch designated standard size.

A system or method according to any embodiment, wherein the arcuate channel of the bender shoe is configured to receive EMT of a ¾-inch designated standard size.

A system or method according to any embodiment, wherein the bender shoe is a combination bender shoe defining a plurality of arcuate channels shaped and sized to receive tubing of different diameters.

A system or method according to any embodiment, wherein the bender shoe is configured to pivot or rotate relative to the portable housing.

A system or method according to any preceding embodiment, further comprising a rechargeable battery configured to power the motor.

A system or method according to any embodiment, wherein the guide member is configured to pivot relative to the bender shoe to complete a 90° bend in less than 10 seconds.

A system or method according to any embodiment, wherein an output speed of the motor is variable.

A system or method according to any embodiment, further comprising a worklight.

A system or method according to any embodiment, wherein the bender shoe includes markings configured to indicate a bend angle of the length of tubing during bending operations.

A system or method according to any embodiment, further comprising a sensor configured to sense an angular position of the guide frame relative to the bender shoe during bending operations.

A system or method according to any embodiment, further comprising a programmable controller configured to automatically cease operation of the motor upon reaching a desired angular position of the guide member relative to the bender shoe as determined by the sensor.

A system or method according to any embodiment, further comprising a display configured to display a digital readout of an angular position of the guide member relative to the bender shoe.

A system or method according to any embodiment, wherein the display further includes a user interface configured to accept a desired angular position of the guide member relative to the bender shoe.

A compact, lightweight, portable tubing bender system configured to enable one-handed operation, the tubing bender system comprising: a portable housing including a handle portion configured to receive a rechargeable battery; a bender shoe operably coupled to the portable housing, the bender shoe defining an arcuate channel configured to restrain a length of tubing along a prescribed arc during bending operations; a guide gear fixedly coupled to the bender shoe; and a guide frame pivotably coupled to the bender shoe, the guide frame including a motor, a driven gear and a guide member, the motor configured to drive the driven gear along the guide gear to pivot the guide frame relative to the bender shoe, so as to move the guide member during bending operations to guide the length of tubing along the arcuate channel of the bender shoe.

A system or method according to any embodiment, wherein the arcuate channel of the bender shoe is configured to receive at least one of Electrical Metallic Tubing (EMT), Rigid Metal Conduit (RMC), Intermediate Metal Conduit (IMC), PVC coated rigid metal conduit, copper tubing, aluminum tubing, stainless steel tubing, tubing used for HVAC or refrigeration systems, tubing used in elevator systems, or other types of tubing or conduit.

A system or method according to any embodiment, wherein the arcuate channel of the bender shoe is configured to receive at least one of EMT of a ½-inch or ¾-inch designated standard size.

A system or method according to any embodiment, wherein the guide member is configured to pivot relative to the bender shoe to complete a 90° bend in less than 10 seconds.

A system or method according to any embodiment, wherein an output speed of the motor is variable.

A system or method according to any embodiment, wherein the motor is at least one of electrically, pneumatically, or hydraulically driven.

A method of using a portable tubing bender to bend tubing with a single hand, the method comprising: positioning a length of tubing between a hook and an arcuate channel defined by a bender shoe; and pivoting a guide frame relative to the bender shoe, the guide frame including a motor, a driven gear and a guide member, the motor configured to drive the driven gear along a guide gear fixedly coupled to the bender shoe to pivot the guide frame relative to the bender shoe, so as to move the guide member during bending operations to guide the length of tubing along the arcuate channel of the bender shoe.

A reduced length portable tubing bender, comprising: a handle portion; a bender shoe and guide gear operably coupled to the handle portion, the bender shoe defining an arcuate channel configured to restrain a length of tubing along a prescribed arc during bending operations, the guide gear defining a central aperture positioned on the handle portion; and a guide frame pivotably coupled to the bender shoe, the guide frame configured to pivot relative to the bender shoe about the central aperture, so as to guide the length of tubing along the arcuate channel of the bender shoe.

A portable tubing bender configured to enable bending of a length of tubing, wherein a first end of the length of tubing is fixed in position relative to an installation environment, the portable tubing bender comprising: a bender shoe and handle portion, the bender shoe defining an arcuate channel configured to restrain a length of tubing along a prescribed arc during bending operations; and a guide frame pivotably coupled to the bender shoe, the guide frame configured to pivot relative to the bender shoe during bending operations to guide a portion of the length of tubing along the arcuate channel of the bender shoe; wherein the bender shoe and handle portion remain fixed in position relative to installation environment during bending operations.

A method of bending tubing comprising: positioning a length of tubing between a hook and an arcuate channel defined by a bender shoe; and pivoting a guide frame relative to the bender shoe to guide the length of tubing along the arcuate channel of the bender shoe, wherein the bender shoe remains fixed in position relative to an installation environment during bending operations.

A portable tubing bender, comprising: a portable housing including a handle portion; a bender shoe operably coupled to the portable housing, the bender shoe defining an arcuate channel configured to restrain a length of tubing along a prescribed arc during bending operations, one or more curved guide wheel channels, and a guide gear in the form of a partial ring gear; and a guide frame including one or more guide wheels configured to traverse along the one or more curved guide wheel channels, a driven gear configured to traverse along the guide gear, a motor configured to provide rotational power to a driven gear, and a guide member configured to guide the length of tubing along the arcuate channel of the bender shoe, wherein the motor is configured to drive the driven gear along the guide gear to pivot the guide frame relative to the bender shoe, so as to move the guide member during bending operations to guide the length of tubing along the arcuate channel of the bender shoe.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A portable tubing bender, comprising:
a portable housing including a handle portion;
a bender shoe operably coupled to the portable housing, the bender shoe defining an arcuate channel configured to restrain a length of tubing along a prescribed arc during bending operations;
a guide gear fixedly coupled to the bender shoe; and
a guide frame pivotably coupled to the bender shoe, the guide frame including a motor, a driven gear and a guide member, the motor configured to drive the driven gear along the guide gear to pivot the motor relative to the bender shoe, so as to move the guide member during bending operations to guide the length of tubing along the arcuate channel of the bender shoe.

2. The portable tubing bender of claim 1, wherein the arcuate channel of the bender shoe is configured to receive at least one of Electrical Metallic Tubing (EMT), Rigid Metal Conduit (RMC), Intermediate Metal Conduit (IMC), PVC coated rigid metal conduit, copper tubing, aluminum tubing, stainless steel tubing, tubing used for HVAC or refrigeration systems, tubing used in elevator systems.

3. The portable tubing bender of claim 1, wherein the arcuate channel of the bender shoe is configured to receive EMT of a ½-inch designated standard size.

4. The portable tubing bender of claim 1, wherein the arcuate channel of the bender shoe is configured to receive EMT of a ¾-inch designated standard size.

5. The portable tubing bender of claim 1, wherein the bender shoe is a combination bender shoe defining a plurality of arcuate channels shaped and sized to receive tubing of different diameters.

6. The portable tubing bender of claim 1, wherein the bender shoe is configured to pivot relative to the portable housing.

7. The portable tubing bender of claim 1, further comprising a rechargeable battery configured to power the motor.

8. The portable tubing bender of claim 1, wherein the guide member is configured to pivot relative to the bender shoe to complete a 90° bend in less than 10 seconds.

9. The portable tubing bender of claim 1, wherein an output speed of the motor is variable.

10. The portable tubing bender of claim 1, further comprising a worklight.

11. The portable tubing bender of claim 1, wherein the bender shoe includes markings configured to indicate a bend angle of the length of tubing during bending operations.

12. The portable tubing bender of claim 1, further comprising a sensor configured to sense an angular position of the guide frame relative to the bender shoe during bending operations.

13. The portable tubing bender of claim 12, further comprising a programmable controller configured to automatically cease operation of the motor upon reaching a desired angular position of the guide member relative to the bender shoe as determined by the sensor.

14. The portable tubing bender of claim 1, further comprising a display configured to display a digital readout of an angular position of the guide member relative to the bender shoe.

15. The portable tubing bender of claim 1, wherein the display further includes a user interface configured to accept a desired angular position of the guide member relative to the bender shoe.

* * * * *